(12) United States Patent
Karakawa et al.

(10) Patent No.: US 7,593,425 B2
(45) Date of Patent: Sep. 22, 2009

(54) SIGNAL DISTRIBUTION METHOD AND A SIGNAL DISTRIBUTION APPARATUS

(75) Inventors: Yoshiyuki Karakawa, Yokohama (JP);
Masaki Bansho, Yokohama (JP); Yuji Kuroki, Yokohama (JP); Junichi Kawaguchi, Yokohama (JP); Koji Hachiya, Yokohama (JP); Satoru Saitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 10/887,471

(22) Filed: Jul. 8, 2004

(65) Prior Publication Data

US 2005/0117608 A1 Jun. 2, 2005

Related U.S. Application Data

(63) Continuation-in-part of application No. PCT/JP03/14521, filed on Nov. 14, 2003.

(30) Foreign Application Priority Data

Jun. 14, 2004 (JP) ............................ 2004-175719

(51) Int. Cl.
H04J 3/16 (2006.01)
H04J 3/00 (2006.01)
G01R 31/08 (2006.01)

(52) U.S. Cl. .................. 370/466; 370/229; 370/474; 370/476

(58) Field of Classification Search .................. 370/468
See application file for complete search history.

(56) References Cited

U.S. PATENT DOCUMENTS

| | | | |
|---|---|---|---|
| 6,205,154 B1 * | 3/2001 | Schmidt et al. ............. | 370/458 |
| 6,731,688 B1 * | 5/2004 | Johnson ....................... | 375/257 |
| 6,901,052 B2 * | 5/2005 | Buskirk et al. .............. | 370/235 |
| 7,039,048 B1 * | 5/2006 | Monta et al. ................. | 370/389 |
| 7,042,848 B2 * | 5/2006 | Santiago et al. ............. | 370/253 |
| 7,075,950 B2 * | 7/2006 | Ortega Rodriguez et al. ........................... | 370/516 |
| 7,298,744 B1 * | 11/2007 | Suh et al. ..................... | 370/393 |
| 7,304,952 B2 * | 12/2007 | Scholten ...................... | 370/235 |
| 7,391,760 B1 * | 6/2008 | Caldwell et al. ............. | 370/352 |
| 7,492,714 B1 * | 2/2009 | Liao et al. .................... | 370/235 |
| 7,496,109 B1 * | 2/2009 | Gupta et al. ................. | 370/413 |
| 2001/0055322 A1 | 12/2001 | Domon | |
| 2002/0087991 A1 * | 7/2002 | Ortega Rodriguez et al. .. | 725/64 |
| 2003/0112833 A1 * | 6/2003 | Kamiya ....................... | 370/535 |
| 2003/0174728 A1 * | 9/2003 | Kamiya et al. .............. | 370/465 |
| 2004/0052274 A1 * | 3/2004 | Wang et al. .................. | 370/468 |
| 2005/0063388 A1 * | 3/2005 | Stacey et al. ............. | 370/395.1 |

FOREIGN PATENT DOCUMENTS

| | | |
|---|---|---|
| JP | 10-190767 | 7/1998 |
| JP | 10-209994 | 8/1998 |
| JP | 2002-344446 | 11/2002 |
| JP | 2003-188843 | 7/2003 |

\* cited by examiner

*Primary Examiner*—Kwang B Yao
*Assistant Examiner*—Jutai Kao
(74) *Attorney, Agent, or Firm*—Katten Muchin Rosenman LLP

(57) ABSTRACT

A signal distribution method and a signal distribution apparatus are disclosed, wherein transport packets of a television signal containing multiplexed channels are provided in a transmission format of a digital broadcasting standard, and such transport packets are transmitted and distributed over a synchronous network. Transmission rate (data speed) of the transport packets of a given customer in the synchronous network is selectable based on the number of multiplexed channels for the customer.

9 Claims, 21 Drawing Sheets

FIG.8

| | | | | | | | | | | | | |
|---|---|---|---|---|---|---|---|---|---|---|---|---|
| DT1-8 | 1 | 13 | 25 | 37 | 2 | 14 | 26 | 38 | 3 | 15 | 27 | 39 |
| DT9-16 | 4 | 16 | 28 | 40 | 5 | 17 | 29 | 41 | 6 | 18 | 30 | 42 |
| DT17-24 | 7 | 19 | 31 | 43 | 8 | 20 | 32 | 44 | 9 | 21 | 33 | 45 |
| DT25-32 | 10 | 22 | 34 | 46 | 11 | 23 | 35 | 47 | 12 | 24 | 36 | 48 |

FIG.9

| #1 | #2 | #3 | #4 |
|----|----|----|----|
| 12 | 24 | 36 | 48 |
| 9  | 21 | 33 | 45 |
| 6  | 18 | 30 | 42 |
| 3  | 15 | 27 | 39 |
| 11 | 23 | 35 | 47 |
| 8  | 20 | 32 | 44 |
| 5  | 17 | 29 | 41 |
| 2  | 14 | 26 | 38 |
| 10 | 22 | 34 | 46 |
| 7  | 19 | 31 | 43 |
| 4  | 16 | 28 | 40 |
| 1  | 13 | 25 | 37 |

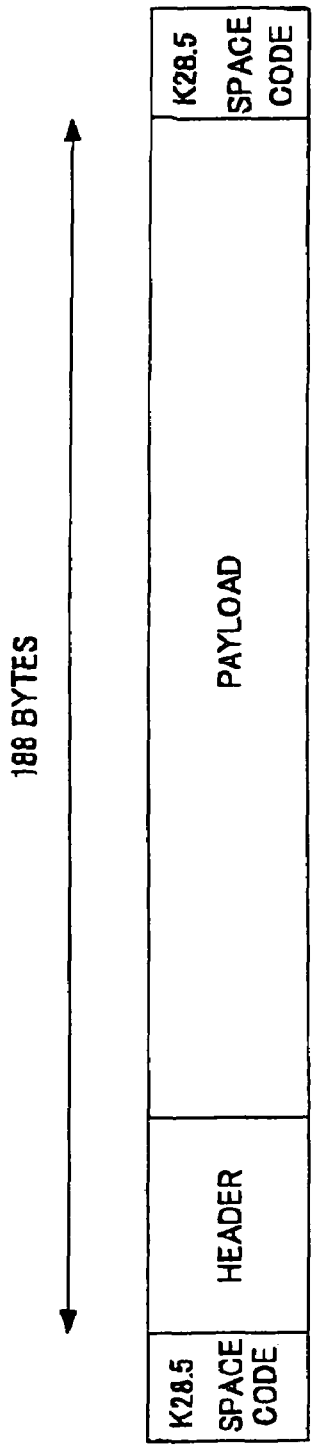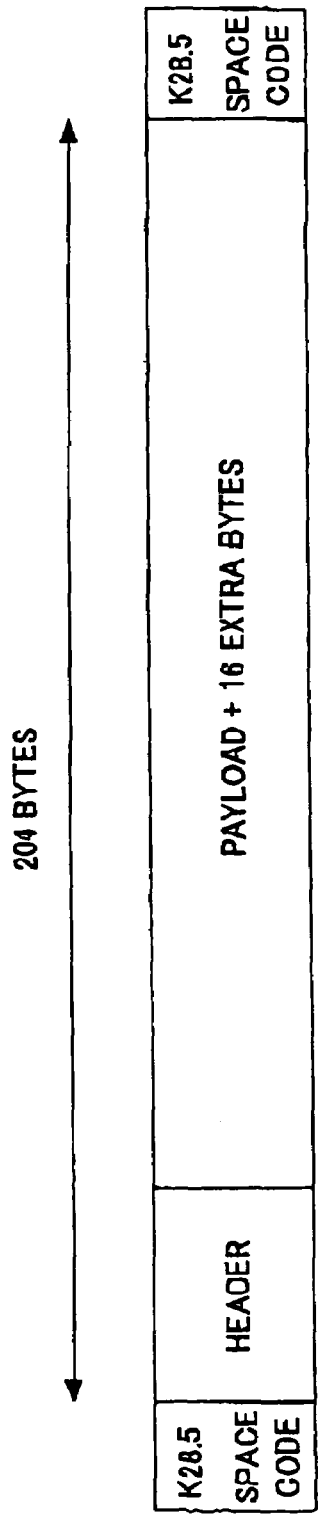

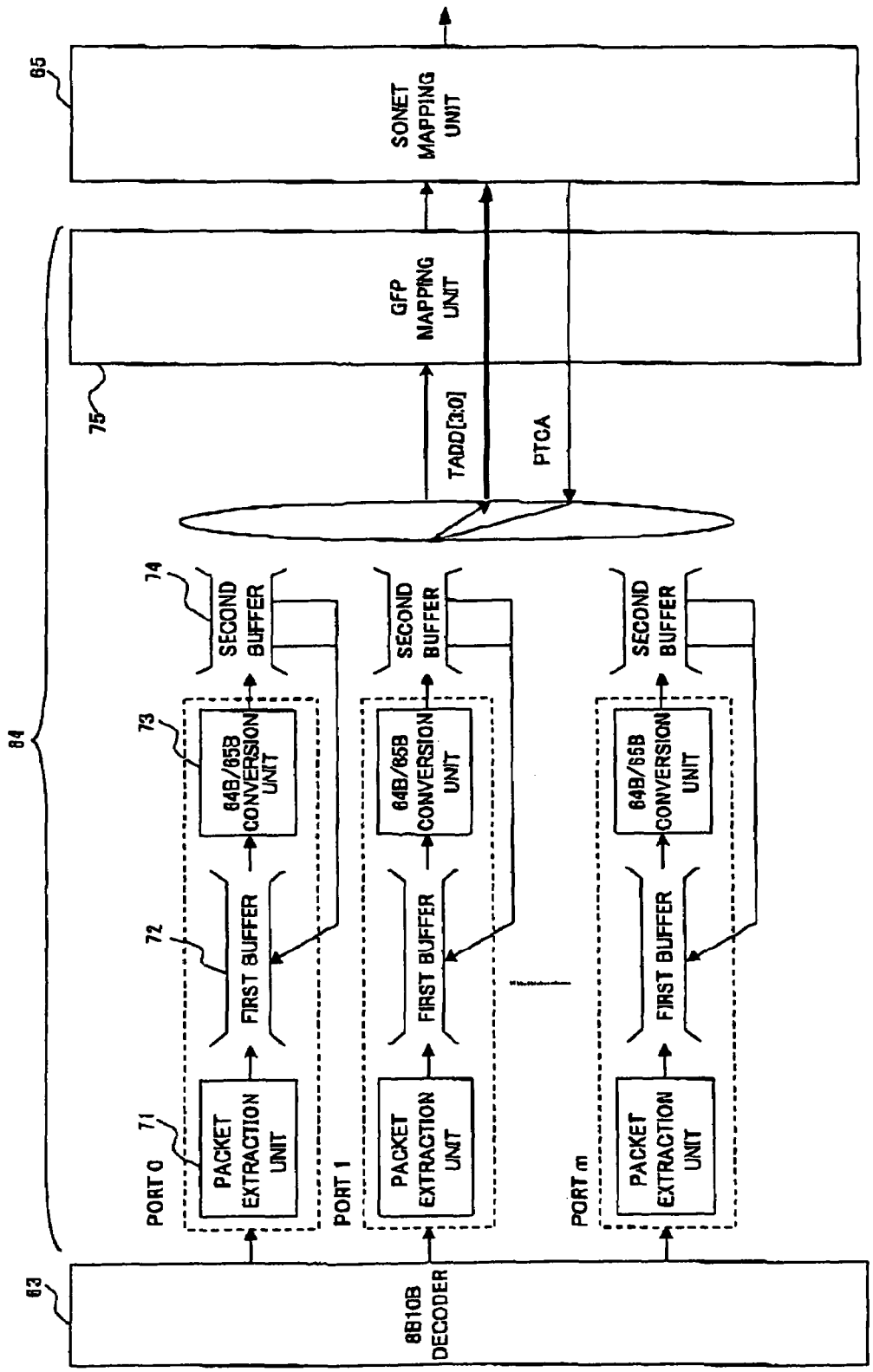

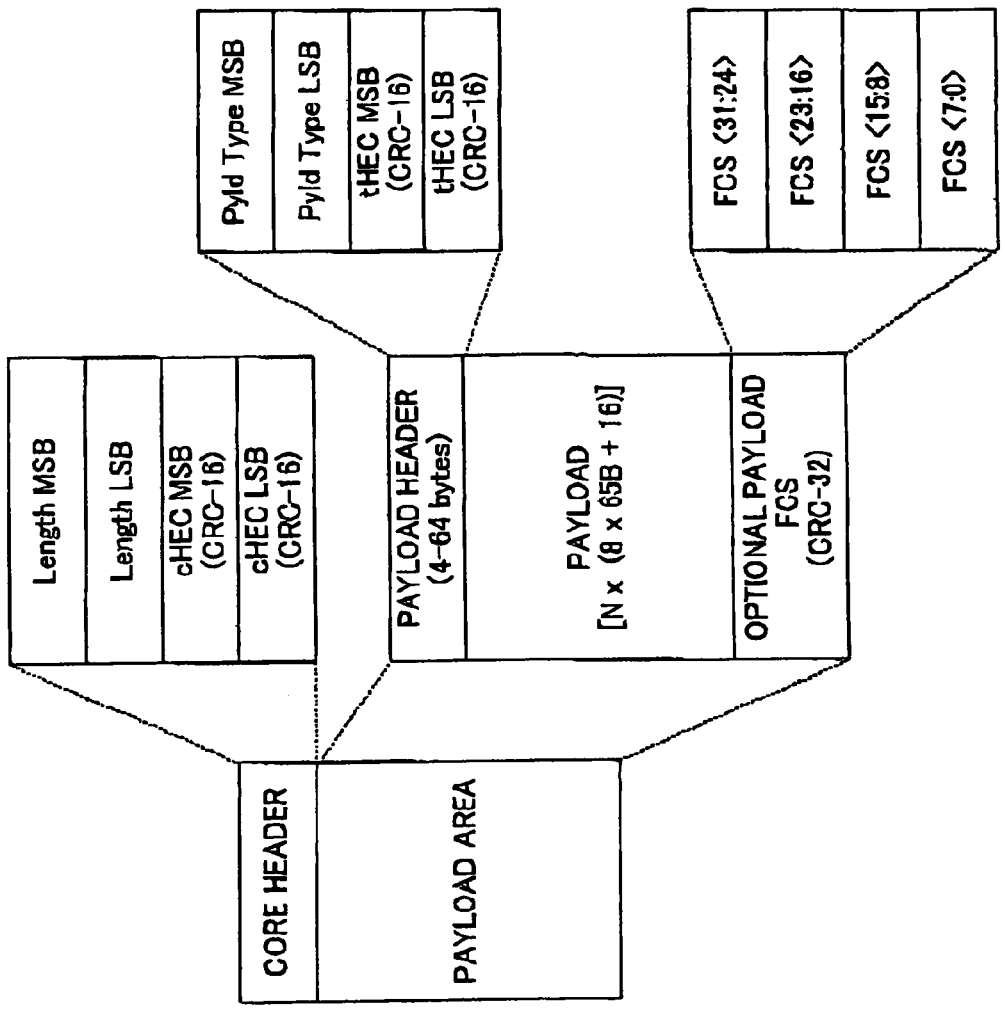

SIGNAL DISTRIBUTION METHOD AND A SIGNAL DISTRIBUTION APPARATUS

CROSS-REFERENCE TO RELATED APPLICATION

The present application is a continuation-in part of and claims priority under 35 U.S.C. § 120 from International Patent Application No. PCT/JP2003/014521 filed on Nov. 14, 2003 and further claims priority under 35 U.S.C. § 119 from Japanese Patent Application Number 2004-175719, filed on Jun. 14, 2004.

BACKGROUND OF THE INVENTION

1. Field of the Invention

The present invention generally relates to a signal distribution method and a signal distribution apparatus, and especially relates to a signal distribution method and a signal distribution apparatus for distributing a television signal transmitted on synchronous networks, such as SONET/SDH (Synchronous Optical Network/Synchronous Digital Hierarchy).

2. Description of the Related Art

Conventionally, a television signal is distributed from a CATV (CAble TeleVision) station and a DTV (Digital TeleVision) station to users (subscribers) based on the analog principle using a 64QAM (Quadrature Amplitude Modulation) method.

FIG. 1 is a block diagram of an example of a conventional television signal distribution system, wherein a CATV head-end station 10 receives a television signal from a source such as a satellite, an IRT (Integrated Receiver Transcoder) 11 modulates the television signal by the 64QAM modulation, a converter 12 converts the modulated signal into an RF signal, a multiplexing unit 13 multiplexes the RF signal and other television signals, and a transmitting unit 14 transmits the multiplexed television signal, which is an analog RF signal, to a network 15. Further, a receiving unit 16 receives the analog RF signal from the network 15, and distributes (splits) the analog RF signal to two or more lines through a distributing unit 17, and amplifiers 18 amplify the distributed (split) RF signal for transmitting the RF signal to each user (CATV subscriber) through each coaxial cable 19.

The conventional analog method has problems in that a large number of channels cannot be served, and a cable telephone service cannot be offered. Recently and continuing, the signal distribution method from the head-end station is being gradually changed from analog to digital, using a CODEC.

FIG. 2 is a block diagram of another example of the conventional television signal distribution system, wherein the head-end station 20 receives a television signal from a source such as a satellite, and an IRT 21 modulates the television signal by the 64QAM modulation. The 64QAM signal and another 64QAM television signal from a video switch 22 are provided to a CODEC/transmitting unit 23.

The CODEC/transmitting unit 23 encodes and digitizes the 64QAM signals, multiplexes the digitized signals, carries out electric/optical conversion such that an optical signal having a transmission rate, e.g., 2.38 Gbps is generated. The optical signal is provided to an optical multiplexing unit 24 for further multiplexing, and transmitted to an optical transmission line 25.

An optical demultiplexing unit 26 demultiplexes the optical signal transmitted via the optical transmission line 25 based on wavelengths. A CODEC/receiving unit 27 carries out optical/electric conversion of the demultiplexed optical signal, and further demultiplexes to acquire each channel. Decoding is performed on each channel such that analog 64QAM signals are obtained. The 64QAM signals are converted to an RF signal by a converter 28, and the RF signal is distributed (split) to two or more lines by a distributing unit 29. Amplifiers 30 amplify the corresponding split signals for distribution, one to each user (subscriber) through corresponding coaxial cables 31.

Here, each of the 64QAM television signals is not compressed, and occupies a bandwidth for 155.52 Mbps per channel. The CODEC/transmitting unit 23 multiplexes the 64QAM television signals into a 2.388 Gbps signal, and the multiplexer 24 multiplexes N 2.388 Gbps signals into an Nx2.388 Gbps signal (N being an integer).

According to this conventional system, the bandwidth of 155 Mbps is needed per channel since the television signal is not compressed; and since the transmission rate of the conventional system is different from the transmission rate of SONET/SDH, a cable telephone service and the like are not available, affinity of the conventional system to SONET/SDH being poor.

In order to solve this problem, there is a method, wherein a CODEC apparatus and a SONET/SDH transmission apparatus are used. FIG. 3 is a block diagram of another example of the conventional television signal distribution system.

In FIG. 3, a head-end station 40 receives a television signal from a source such as a satellite, and an IRT 41 modulates the received television signal into a 64QAM signal, which is supplied to a CODEC/transmitting unit 43. Further, another 64QAM television signal is provided from a video switch 42 to the CODEC/transmitting unit 43.

The CODEC/transmitting unit 43 encodes and digitizes each of the 64QAM television signals, multiplexes the encoded and digitized signals, and carries out electric/optical conversion. Each of the encoded and digitized signals is mapped to a path STS-xx of SONET/SDH at the rate of 155 Mbps per channel, provided to a SONET/SDH transmitting unit 44, and transmitted to an optical transmission line 45 serving as a communication line OC-xx (Optical Carrier-xx) of the SONET/SDH system from the SONET/SDH transmitting unit 44.

A SONET/SDH receiving unit 46 receives the optical signal transmitted via the optical transmission line 45, and the electrical signal mapped by the path STS-xx of SONET/SDH is obtained. The electrical signal is demultiplexed by a CODEC/receiving unit 47, and decoded for every channel such that the analog 64QAM signals are obtained. The 64QAM signals are converted into an RF signal by a converter 48. The RF signal is distributed (split) to two or more lines by a distributing unit 49, and is distributed to each user.

This is a costly method as compared with the conventional analog method, and management of the CODEC apparatuses and the SONET/SDH apparatuses becomes complicated.

In an attempt to solve this problem, a method is proposed wherein MPEG-2TS (Transport Stream) packets of the MPEG (Moving Picture Exports Group) specification are transmitted via a SONET/SDH transmission network in the transmission format of DVB-ASI (Digital Video Broadcasting ASynchronous Interface), which is a European digital broadcasting format. For example, Patent Reference 1 discloses a method such as described above.

[Patent Reference 1] JP, 10-190767, A

[Description of the Invention]

[Problem(s) to be Solved by the Invention]

According to the method wherein MPEG-2TS packets are transmitted over a SONET/SDH transmission network in the transmission format of DVB-ASI, since a television channel can be compressed to a minimum size of 3.75 Mbps per channel, a maximum of 72 channels can be received by each DVB-ASI of a SONET/SDH transmission apparatus.

In order that a CATV station can provide hundreds of 3.75 Mbps MPEG-2TS packet channels to the DVB-ASI interface of the SONET/SDH transmission apparatus, the DVB-ASI interface is prepared with a sufficient number of ports. However, not all of the ports are fully loaded with 72 channels, but some ports may carry only a few channels. Here, 3.75 Mbps× 72 channels=270 Mbps, which is equal to the maximum receiving data rate of the DVB-ASI.

Usually, when assigning a bandwidth for the maximum data rate 270 Mbps of DVB-ASI in the SONET/SDH network, STS-1-6V (311.04 Mbps) is assigned in SONET, and STM-1-2V (311.04 Mbps) is assigned in SDH.

Even if an actual requirement for the bandwidth is less than 311.04 Mbps, a customer (CATV operator) has to purchase (or lease, and so on) an STS-1-6V. That is, the problem is that there is no method available for assigning a band of the SONET/SDH optimally and flexibly according to customer (CATV operator) requirements.

Further, even if a CATV station is able to transmit MPEG-2TS packets via a narrowed bandwidth, i.e., partially loading STS-1-6V, the SONET/SDH apparatus on the receiving side, which expects to receive data at the 311.04 Mbps data rate, has to be equipped with some compensating means for receiving the partially loaded STS-1-6V. The problem is that there is no specific processing method available.

SUMMARY OF THE INVENTION

Accordingly, the present invention is made in view of the above-mentioned problems, and aims at offering a signal distribution method and a signal distribution apparatus that realize flexible assignment of the bandwidth of a synchronous network according to requirements of a customer (CATV operator), substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a signal distribution method and a signal distribution apparatus particularly pointed out in the specification in such full, clear, concise, and exact terms as to enable a person having ordinary skill in the art to practice the invention.

The present invention offers, among other things, flexible bandwidth assignment according to requirements of customers (typically CATV operators) of a synchronous network, wherein transport packets of a television signal containing multiplexed channels are supplied in a transmission format of a digital broadcasting standard, and the transport packets are transmitted over the synchronous network.

To achieve these and other advantages and in accordance with the purpose of the invention as embodied and broadly described herein, the invention provides as follows.

The present invention provides transmission rate setting up means for setting up a transmission rate (data speed) in the synchronous network according to the number of multiplexed channels of each of the customers.

The present invention further provides packet discarding means for discarding transport packets in excess of the transmission rate.

Further, the present invention provides GFP frame mapping means for converting transport packets into superblocks when the number of the transport packets stored in a buffer reaches/exceeds a predetermined number.

In the case that the number of the transport packets in the buffer is/becomes less than the predetermined number, the GFP frame mapping means suspends the superblock conversion process for a predetermined wait period. If additional transport packets arrive at the buffer, and the number of the transport packets reaches/exceeds the predetermined number within the predetermined wait period, the superblock conversion takes place. Otherwise, that is, if the number of the transport packets in the buffer remains less than the predetermined number at the end of the predetermined wait time, a necessary quantity of PAD control codes are added, and the superblock conversion takes place.

The GFP mapping means then maps the superblocks onto GFP frames. In this manner, the bandwidth of the synchronous network can be efficiently used.

The present invention further provides a receiving unit for receiving a signal that contains transport packets of a television signal containing multiplexed channels, the transmission rate (data speed) of the signal being based on the number of the multiplexed channels of the customer (CATV operator), from a synchronous network in the transmission format of a digital broadcasting standard.

The receiving unit includes output rate control means for adding space codes between transport packets extracted from the received signal such that the output rate is aligned with the transmission rate.

The receiving unit further includes 8B10B encoding means for performing 8B10B encoding of the transport packets that are read from a buffer, and to convert the format into the transmission format of DVB-ASI. The 8B10B encoding means also have a function to suspend reading operations for the duration of a read-out wait time that is calculated based on the number of transport packets stored in the buffer.

[Effect of the Invention]

According to the present invention, the bandwidth of the synchronous network can be flexibly assigned based on the customer requirement.

BRIEF DESCRIPTION OF THE DRAWINGS

FIG. 8 is a chart showing data of STS-48;

FIG. 9 is a chart showing the structure of four-line parallel data of STS-12;

FIG. 10 is a chart showing the format of a DVB-ASI signal;

FIG. 11 is a block diagram for explaining transmission rate control according to the present invention;

FIG. 12 is a chart showing a GFP frame format;

DESCRIPTION OF THE PREFERRED EMBODIMENTS

In the following, embodiments of the present invention are described with reference to the accompanying drawings.

Figure 1:
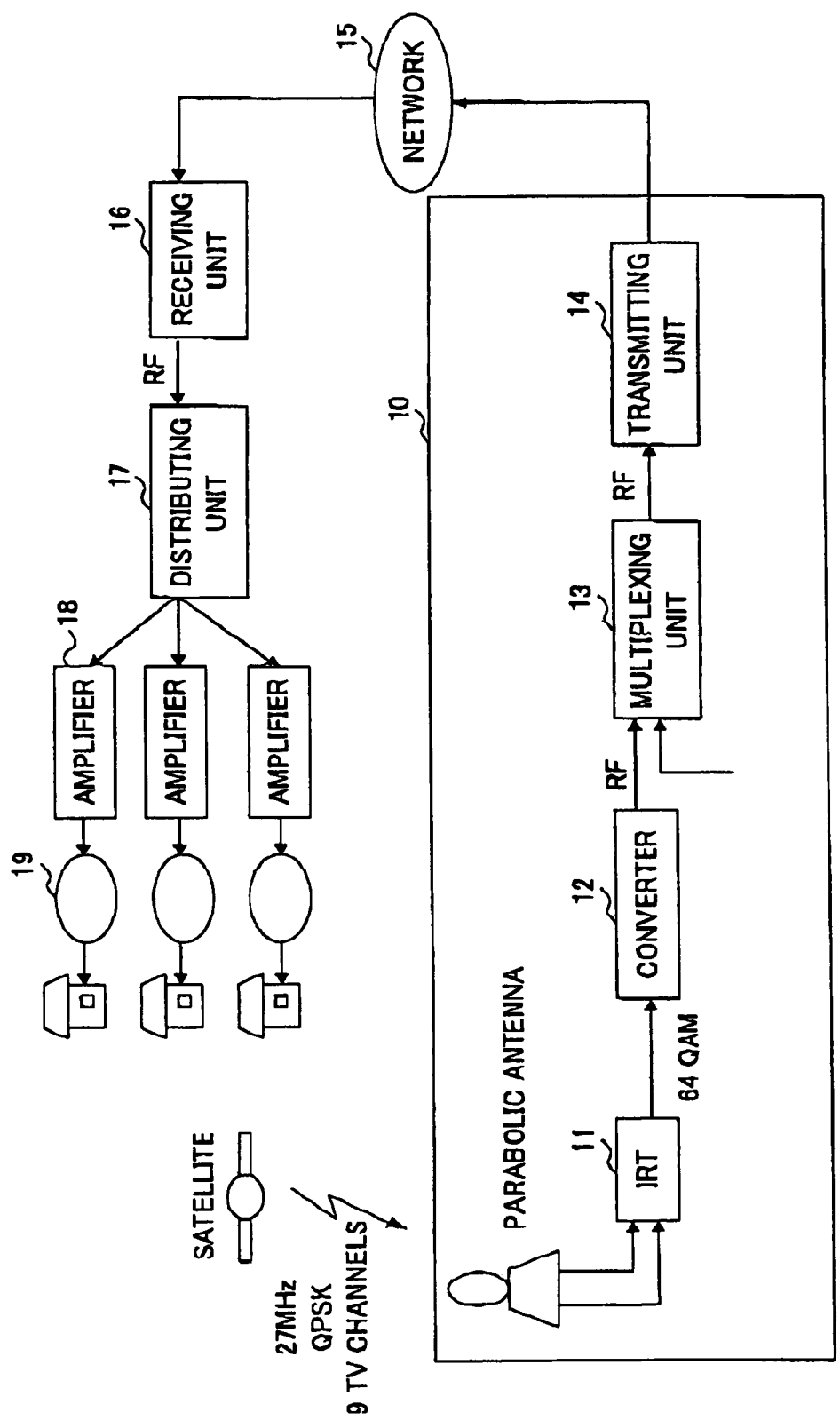
FIG. 1 is a block diagram of an example of a conventional television signal distribution system.
Figure 2:
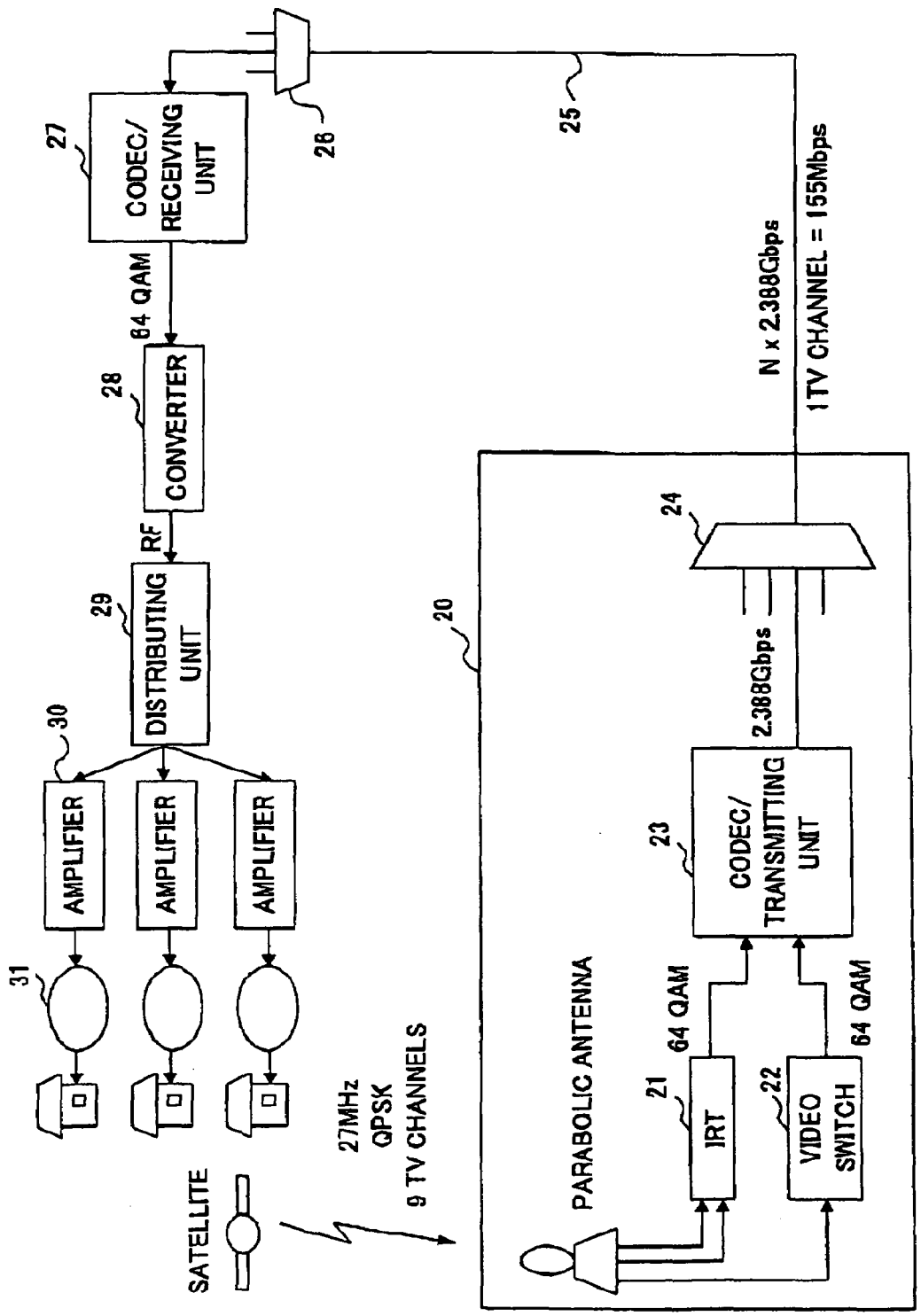
FIG. 2 is a block diagram of another example of the conventional television signal distribution system.
Figure 3:
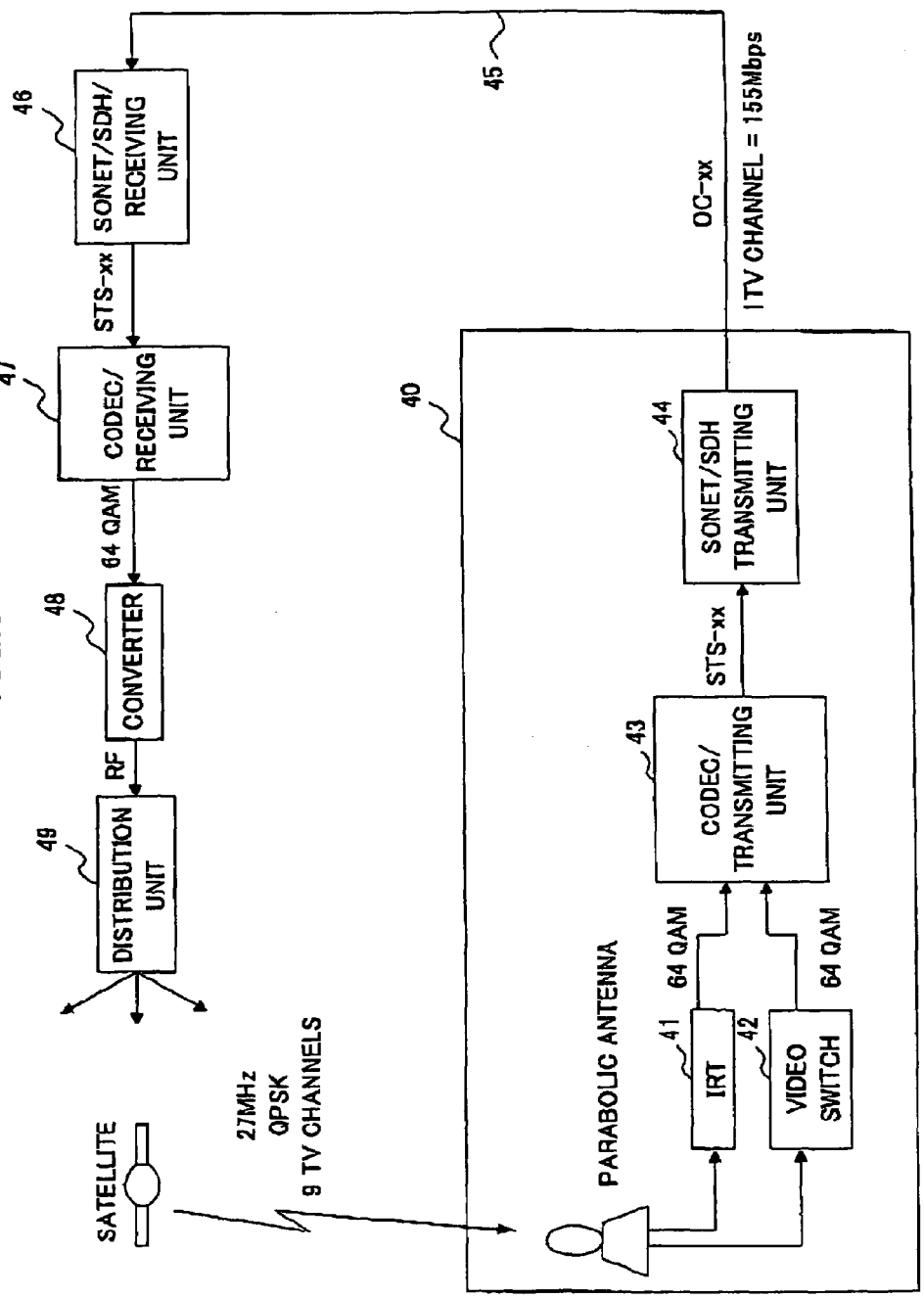
FIG. 3 is a block diagram of another example of the conventional television signal distribution system.
Figure 4:
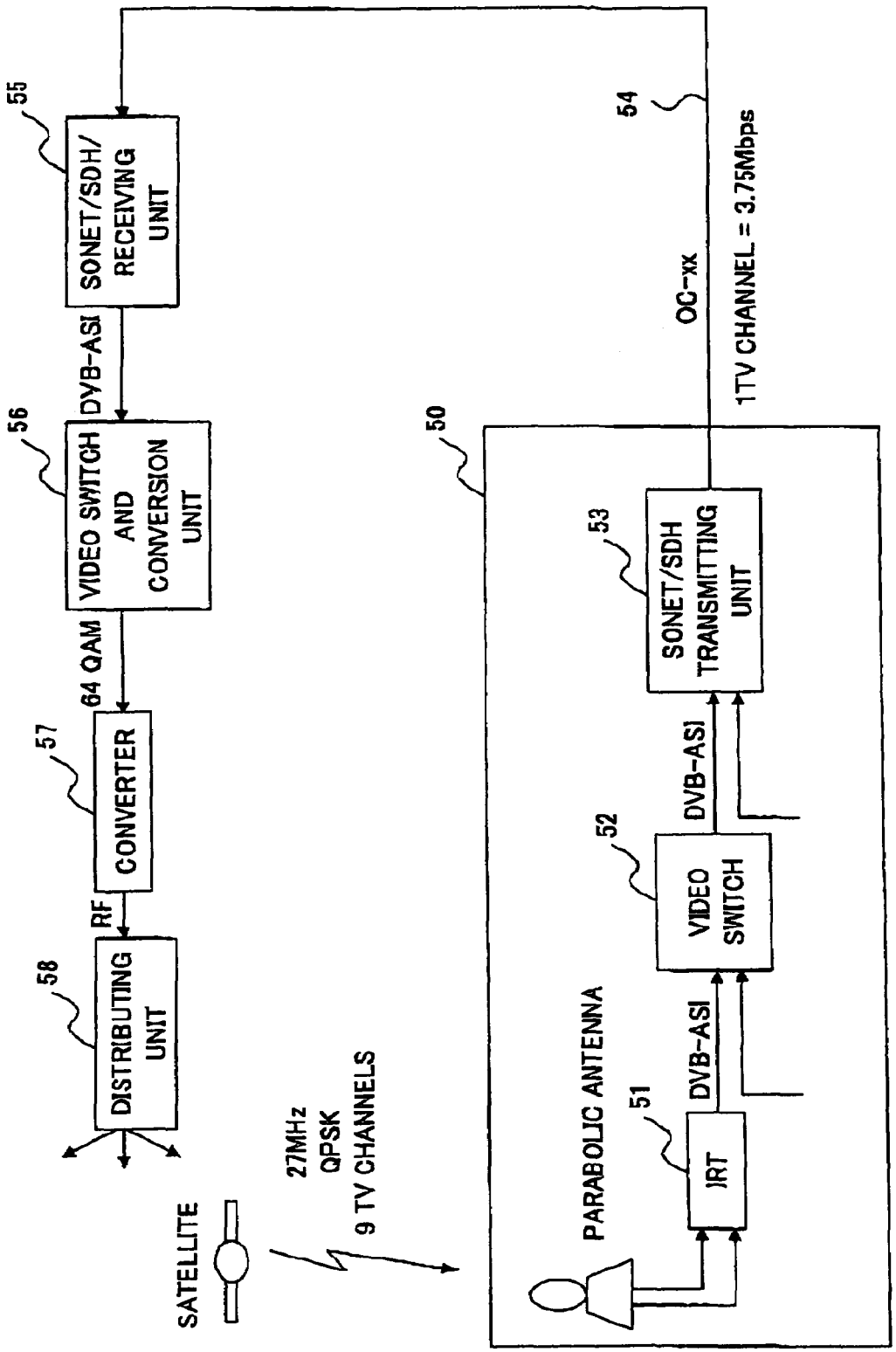
FIG. 4 is a block diagram of a transmission apparatus according to an embodiment of the present invention, to which transmission apparatus a signal distribution method according to the embodiment the invention is applied.

FIG. 4 is a block diagram of a transmission apparatus according to the embodiment of the present invention, to which the signal distribution method of the present invention is applied A head-end station 50 of CATV receives television signals from a source such as a satellite. An IRT 51 converts and multiplexes the television signals into a DVB-ASI signal, which is then provided to a video switch 52 as the DVB-ASI signal of a customer (CATV operator). Similarly, DVB-ASI signals of other customers (CATV operators) are provided to the video switch 52. The video switch 52 selects DVB-ASI signals of such customers, and the selected DVB-ASI signals are provided to input ports of a SONET/SDH transmitting unit 53.

Each input port of the SONET/SDH transmitting unit 53 is capable of handling a DVB-ASI signal containing the maximum of 72 channels of MPEG-2TS packets (3.75 Mbps×72 channels=270 Mbps). The SONET/SDH transmitting unit 53 accommodates the DVB-ASI signals in the SONET/SDH format, performs STS switching, and transmits an optical signal on an optical transmission line 54.

A SONET/SDH receiving unit 55 on the receiving side receives the optical signal via the optical transmission line 54, performs STS switching, and converts the optical signal into DVB-ASI signals. The DVB-ASI signals are provided to a video switch and conversion unit 56, a selected DVB-ASI signal in MPEG-2 form is converted into a television signal form, and a 64QAM modulation is carried out resulting in a 64QAM signal. The converter 57 carries out frequency conversion on the 64QAM signal such that an RF signal is obtained, and the RF signal is distributed to two or more lines by a distributing unit 58 for distribution to each user (subscriber).

Figure 5:
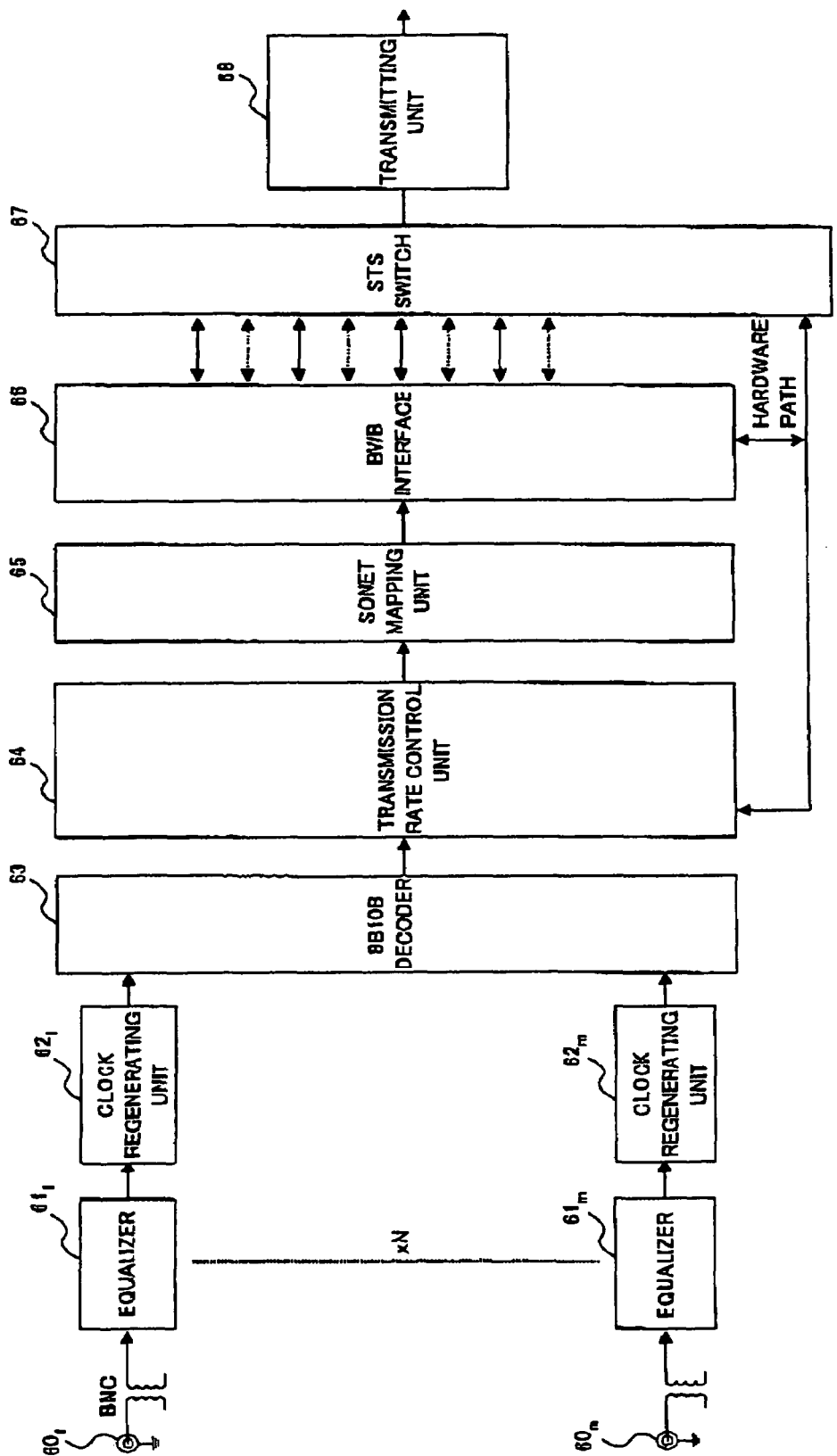
FIG. 5 is a block diagram of a SONET/SDH transmitting unit 53 according to the embodiment of the present invention.

FIG. 5 is a block diagram of the SONET/SDH transmitting unit 53 according to the embodiment of the present invention. The SONET/SDH transmitting unit 53 includes input ports $60_1$ through $60_m$, equalizers $61_1$ through $61_m$, clock regenerating units $62_1$ through $62_m$, an 8B10B decoder 63, a transmission rate control unit 64, a SONET mapping unit 65, a BWB interface 66, an STS switch 67, and a transmitting unit 68.

Each of the input ports $60_1$ through $60_m$ receives a DVB-ASI signal that contains the maximum of 72 channels of 3.75 Mbps MPEG-2 signals. The equalizers $61_1$ through $61_m$ carry out automatic waveform equalization of the DVB-ASI signals. The clock regenerating units $62_1$ through $62_m$ convert the clocks of the received signals into the internal clock. The DVB-ASI signal from each input port is supplied to the 8B10B decoder 63.

The 8B10B decoder 63 converts ten-bit codes of the DVB-ASI signals into eight-bit codes such that signals, of which transmission rate of actual character data is a maximum of 216 Mbps, are supplied to the transmission rate control unit 64. The transmission rate control unit 64 controls the transmission rate, and the DVB-ASI signals are mapped onto GFP frames.

The SONET mapping unit 65 maps the GFP frames to paths STS-1-1v, STS-1-3v, STS-1-5v, and STS-1-6v by virtual concatenation, the GFP frames accommodating mapped DVB-ASI signals that are input from the input ports $60_1$ through $60_m$, based on contracts with customers (CATV operators), each customer being assigned to one or more of the input ports $60_1$ through $60_m$. Further, the paths STS-1-1v, STS-1-3v, STS-1-5v, and STS-1-6v are mapped to channels 1 through 48 of a path STS-48 as shown in FIG. 8.

Figure 6:
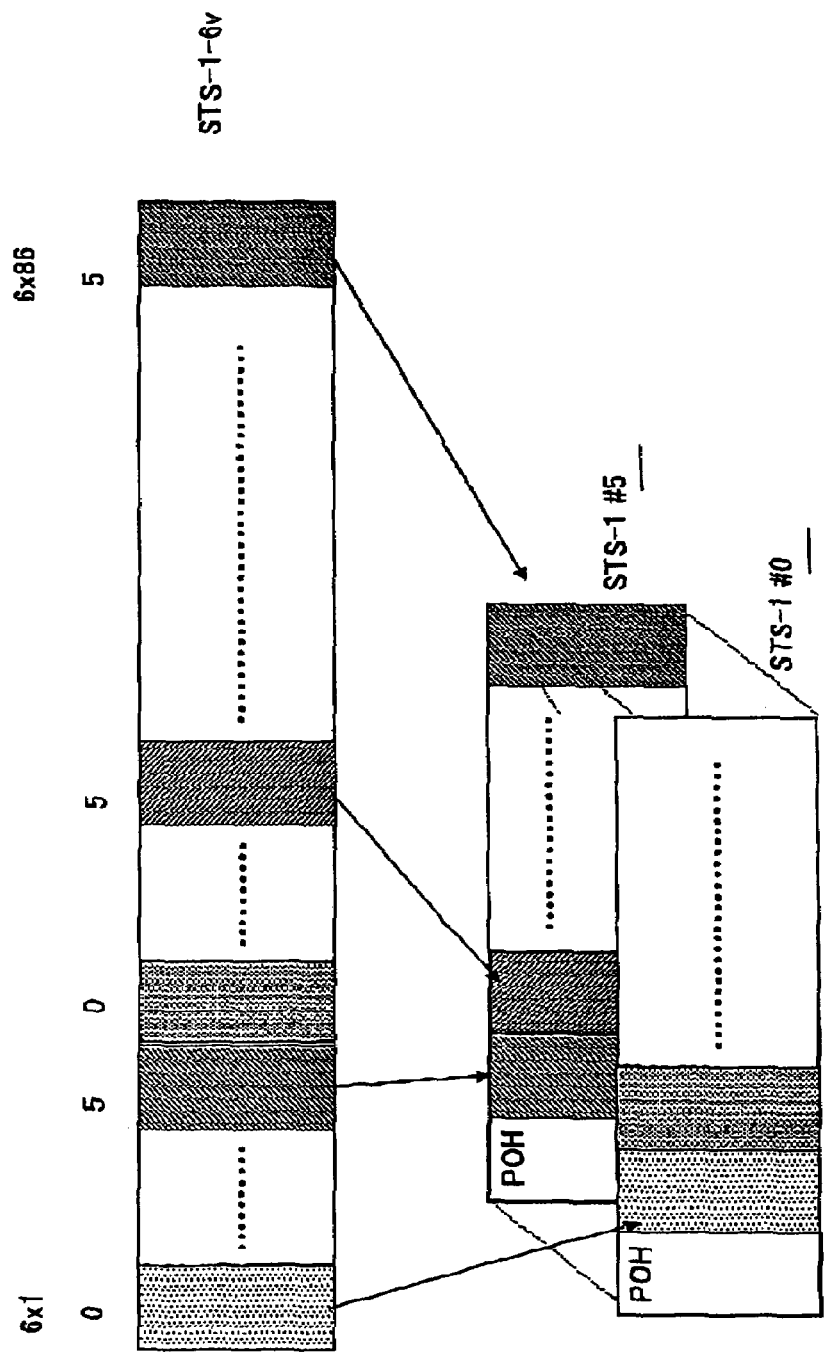
FIG. 6 is a chart for explaining how a DVB-ASI signal is mapped in STS-1-6v.

Here, the case wherein a DVB-ASI signal of 270 Mbps is mapped by an STS-1-6v (311 Mbps) using six units of STS-1 (52 Mbps) is explained. As shown in FIG. 6, the payload of STS-1-6v consists of columns that are expressed by shaded blocks in FIG. 6, each of the columns being loaded by one of the six units of STS-1, namely, STS-1#0 through STS-1#5. In this manner, the STS-1-6v is decomposed into the six units of STS-1, and each STS-1 stores sequence numbers for each column in an H4 byte within a path overhead (POH).

Figure 7:
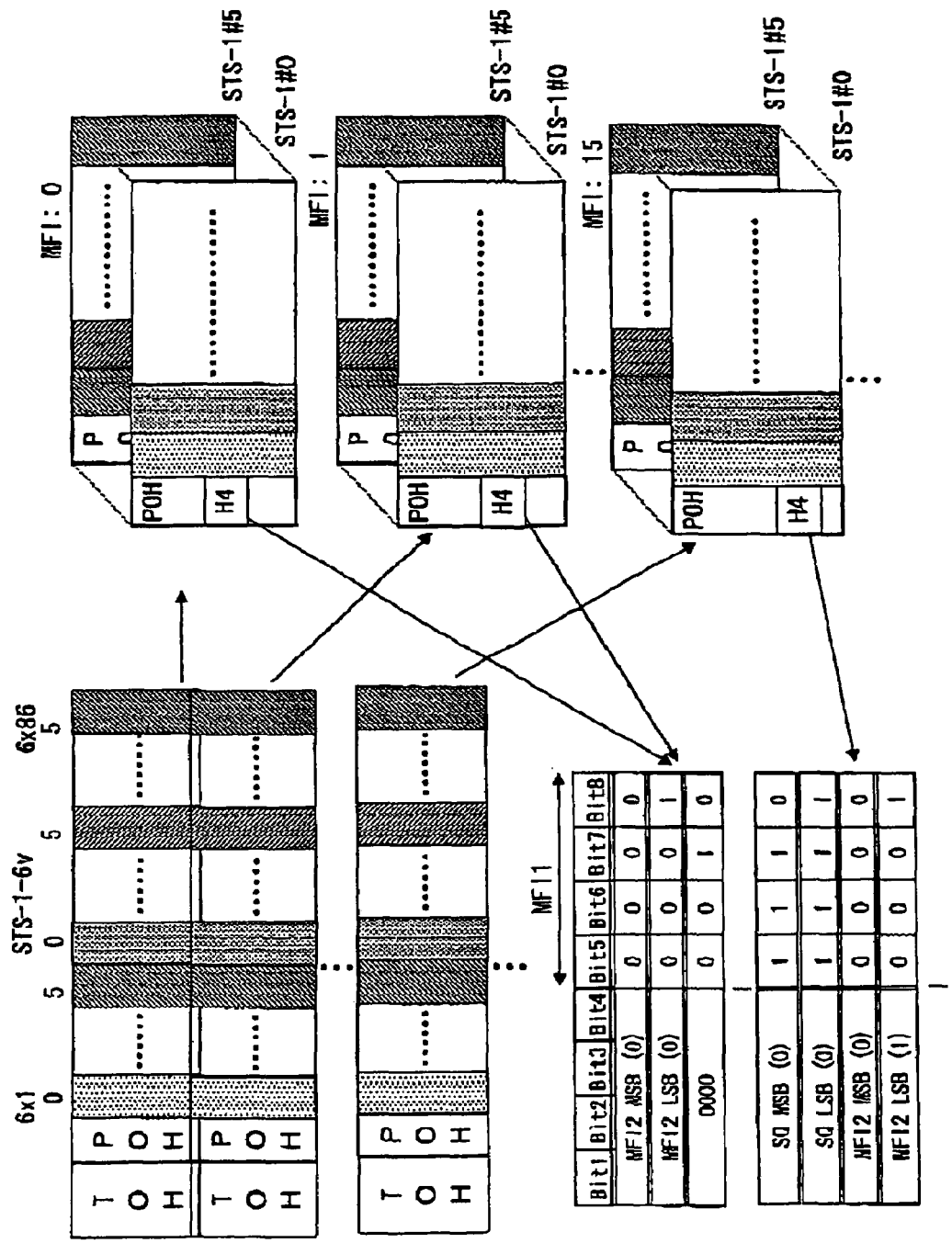
FIG. 7 is a chart for explaining an H4 byte in the case of multiple framing.

Descriptions of the H4 byte in the case of multi-framing follow with reference to FIG. 7. Each STS-1 includes an MFI (Multi Frame Indicator) that consists of 8 bits. Of the 8 bits, the 4 lower bits serve as an MFI1, and the 4 higher bits serve as an MFI2. The MFI1 expressed by bits 5 through 8 is incremented for each frame. The MFI2 is expressed by bits 1 through 4 when MFI1=0, 1. When MFI1=0 it is MSB of MFI2. When MFI1=1, it is LSB of MFI2. Further, the sequence number SQ consisting of 8 bits is expressed by the bits 1 through 4 when MFI1=14, 15. When MFI1=14, it is MSB of the sequence number. When MFI1=15, it is LSB of the sequence number.

The BWB interface 66 converts 32-bit parallel data of STS-48 as shown in FIG. 8 into four streams of 8-bit parallel data of STS-12 as shown in FIG. 9. The converted data are further converted into serial data, and are supplied to the STS switch 67. Here, in FIG. 8 and FIG. 9, numbers 1 through 48 represents channel numbers.

The data switched by the STS switch 67 are provided to the transmitting unit 68, and are transmitted via the optical transmission line 54 at the transmission rate of STS-48 (2488 Mbps).

Since hundreds of DVB-ASI signal channels are input to the SONET/SDH transmitting unit 53, a required number of input ports $60_1$ through $60_m$ are provided, the DVB-ASI signal being formatted as shown in FIG. 10.

However, not all the input ports are fully loaded with 72 channels of MPEG-2 signals each using 3.75 Mbps (i.e., 270 Mbps, the maximum receiving data-rate of DVB-ASI). That is, some input ports may be loaded with only a few DVB-ASI signal channels.

Nevertheless, when assigning a band of the SONET network, STS-1-5v has to be conventionally assigned whether or not an input port is fully loaded. In other words, customers (CATV operators) have to purchase (lease or otherwise) STS-1-5v even if a smaller capacity, such as STS-1-1v (51.84 Mbps) and the like are sufficient.

According to the present invention, GPF frames that are mapped with DVB-ASI signals input from the input port $60_1$-$60_m$ are mapped to one of STS-1-1v, STS-1-3v, STS-1-5v, and STS-1-6v by virtual concatenation. In this manner, bandwidth assignment can be performed according to requirements of the customers, resulting in an efficient bandwidth use of the SONET/SDH network.

FIG. 11 is a block diagram for explaining the transmission rate control according to the present invention, detailing the transmission rate control unit 64. The transmission rate control unit 64 includes packet extraction units 71, first buffers 72, 64B/65B conversion units 73, second buffers 74, and a GFP mapping unit.

The DVB-ASI signals supplied to the input ports $60_1$ through $60_m$ are converted to eight-bit codes by the 8B10B decoder 63, and the eight-bit codes are provided to the respective packet extraction units 71. The packet extraction unit 71 extracts MPEG-2TS packets, and K28.5 space codes for clock sync, which space codes delimit the MPEG-2TS packets. While all the extracted MPEG-2TS packets are written to the first buffer 72, the K28.5 space codes are removed when writing to the first buffer 72. However, in order to take a clock synchronization at the SONET/SDH receiving unit 55 when reading a superblock from the second buffer 74, at least 2 bytes of the K28.5 space codes remain between MPEG-2TS packets.

Frame conversion of 64B/65B is carried out on each of the MPEG-2TS packets read from the first buffer 72 by the 64B/65B conversion unit 73 as a pretreatment before passing the signal to the GFP mapping unit 75. The frame after this conversion is called a superblock.

The superblock is written to the second buffer 74. The superblocks stored in the second buffers 74 corresponding to each port are read using a round robin method, and the read superblocks are provided to the GFP mapping unit 75. The GFP mapping unit 75 maps the provided superblocks to the GFP frame that has a format as shown in FIG. 12. At this time, the second buffer 74 corresponding to the provided superblocks supplies a 3-bit signal TADD to the SONET mapping unit 65 via the GFP mapping unit 75, and waits for a response PTCA from the SONET mapping unit 65.

Here, when the bandwidth of the MPEG-2TS packets input to a certain port is wider than the band prepared on the side of SONET (i.e., when a MPEG-2TS packet signal in excess of contracted bandwidth is input), superblocks cannot be sent out to the GFP mapping unit 75 as fast as the input, and are accumulated in the second buffer 74.

In order to cope with this situation, a first threshold value is defined for the second buffer 74. When the amount of data in the second buffer 74 reaches the first threshold value, the first buffer 72 is prevented from writing any more MPEG-2TS packets. The first threshold value is predetermined at an adequate capacity level of the second buffer 74. In this manner, writing of MPEG-2TS packets in excess of the contracted capacity is prevented with excessive packets being discarded by the first buffer 72.

Further, in the case that MPEG-2TS packets are discarded by the first buffer 72 as above, since as the time passes, the superblocks stored in the second buffer 74 will have been output, the second buffer 74 will become able to accept new superblocks. Accordingly, a second threshold value is prepared so that writing of MPEG-2TS packets to the second buffer 74 by the first buffer 72 is resumed, where the second threshold value is set less than the first threshold value. When the load of the second buffer 74 is decreased to a level lower than the second threshold value, writing by the first buffer 72 of MPEG-2TS packets is permitted.

In this manner, even if the flow rate of the data (MPEG-2TS packets) that are input through the input port exceeds the capacity of SONET/SDH, the quality of the data transmission is protected from suddenly degrading for a certain time period without suddenly starting packet discarding by the effect of the transmission rate control unit controlling the flow rate.

The 64B/65B conversion unit 73 performs 64B/65B conversion in compliance with the method standardized by the ITU-T recommendation G.7041/Y.1303. An MPEG2-TS packet is divided into 8-byte slices. If there is a control code in a given slice, the control code is converted by the conversion rule, and the slice is realigned. Eight units of the 8-byte slices are bundled, and a 1-byte leading flag LF is added, which LF indicates whether a control code is present in the 8-byte slices, and a superblock consisting of 65 bytes is obtained. That is, in order to constitute a superblock, a 64-byte packet is required.

Since an MPEG2-TS packet is one of 188 bytes and 204 bytes long, multiple superblocks are needed for converting the MPEG2-TS packet. According to the present embodiment, two K28.5 space codes are assigned per packet, and the total number of the bytes becomes 190 bytes and 206 bytes, respectively.

When the MPEG2-TS packet is 188 bytes long, three superblocks are required, leaving 2 vacant (unused) bytes. When the MPEG2-TS packet is 204 bytes long, four superblocks are required, leaving 50 vacant bytes. Such vacant bytes are often loaded by PAD control codes that are discarded in a 64B/65B decoding process on the receiving side.

Figure 13:
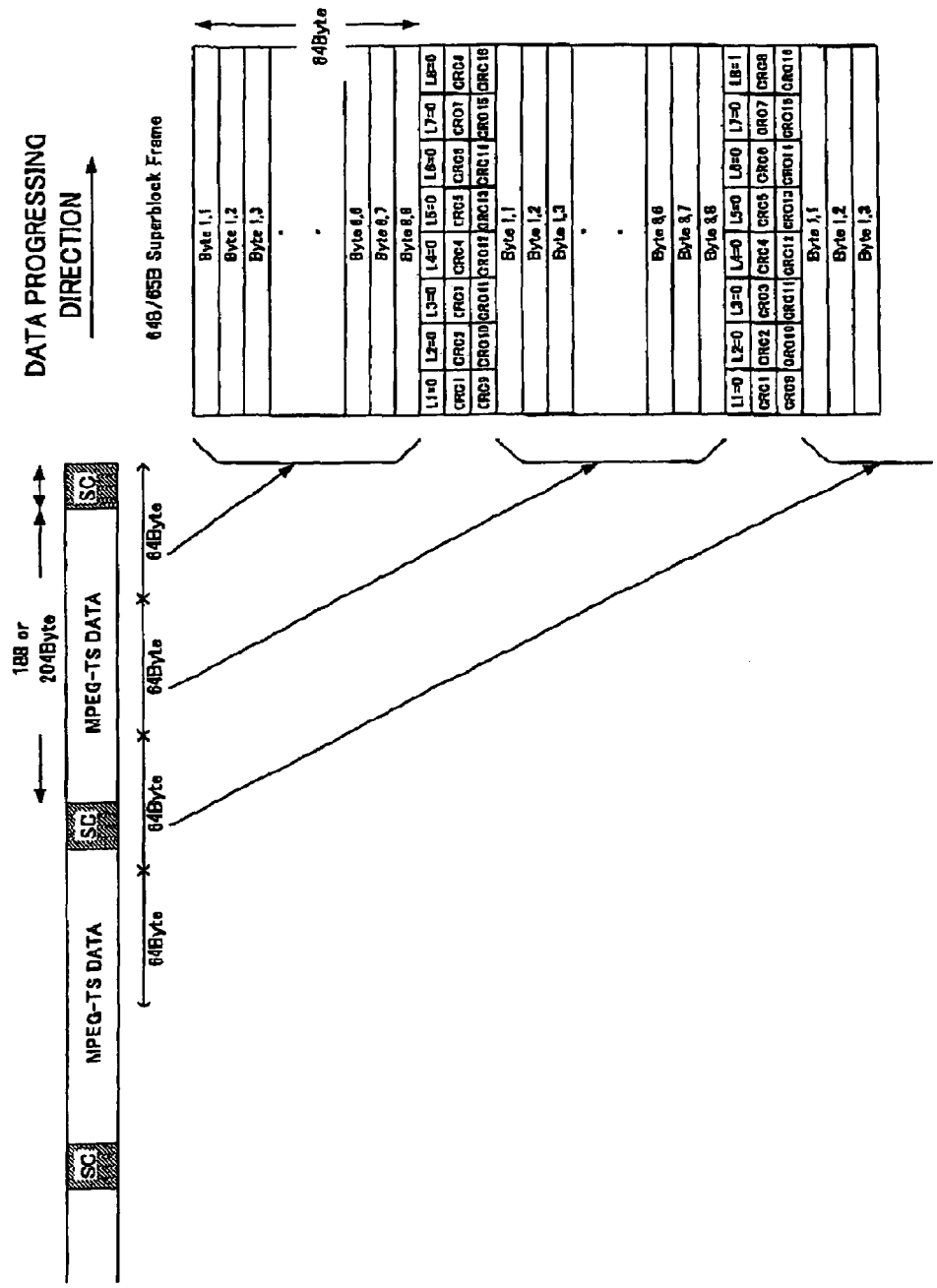
FIG. 13 is a chart showing the outline of a superblock conversion process.

According to the present invention, in order to efficiently use the bandwidth of the SONET/SDH transmission network, a superblock conversion process is performed with no regard for boundaries of packets. The outline of the superblock conversion process is shown in FIG. 13. An MPEG2-TS packet is stored in the first buffer 72 shown in FIG. 11, from which packet all space codes other than a space code SC at the head of the packet are deleted. A superblock is constituted by taking every 64 bytes from the head of the MPEG-2TS packet stored in the first buffer 72 with no regard for the boundary between packets.

There is a possibility that less than 64 bytes of data temporarily remain in the first buffer 72 depending on the data rate of the MPEG-2TS packet, resulting in an insufficient state for generating a superblock. In this case, one or more PAD control codes are not immediately inserted; rather, the superblock conversion process waits for a predetermined wait time. The superblock conversion process resumes when 64 bytes or more of data are stored in the first buffer 72. The wait time is predetermined based on the MPEG-2TS rate of a customer (CATV operator), the bandwidth of the SONET/SDH transmission line, and the like.

After the wait time, if the data stored in the first buffer 72 still amount to less than 64 bytes, in order to lessen delivery delay of the packet, one or more PAD control codes are inserted, and a superblock is generated.

Figure 14A:
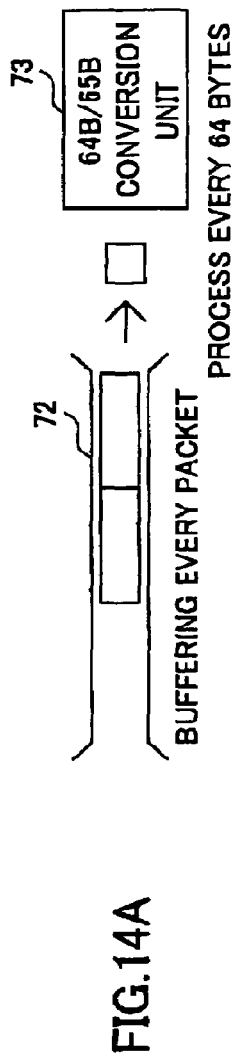
FIG. 14 shows how the superblock is structured.
Figure 14B:
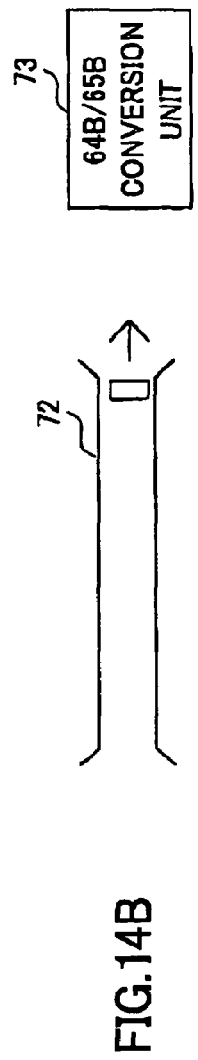
Figure 14C:
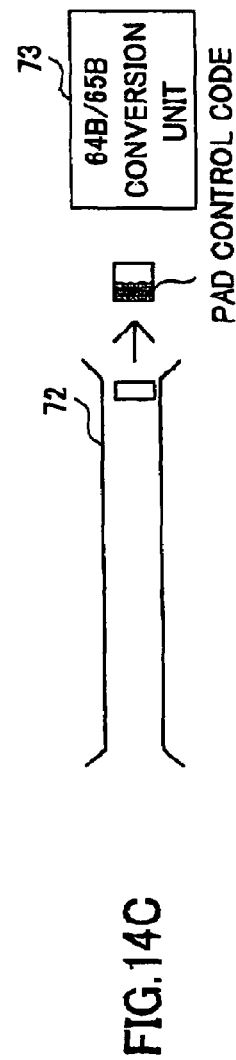

Above operations are illustrated in Sections (A) through (C) of FIG. 14. Section (A) of FIG. 14 shows the case wherein 64 bytes or more of MPEG2-TS packet data are stored in the first buffer 72. Here, every 64 bytes of data are read from the top, and the 64B/65B conversion unit 73 generates a superblock.

Section (B) of FIG. 14 shows the case wherein less than 64 bytes of MPEG2-TS packet data are available in the first buffer 72. Here, the superblock conversion process is suspended for the predetermined wait time, waiting for arrival of additional bytes.

Section (C) of FIG. 14 shows the case wherein the amount of data stored in the first buffer 72 still remains less than 64 bytes, one or more PAD control codes are immediately inserted to makes it 64 bytes, and the 64 bytes are provided to the 64B/65B conversion unit 73. This represents the case where MPEG2-TS packet data do not amount to 64 bytes even after the wait time, and a superblock is generated using the PAD control codes in order to minimize delay in the data transmission process.

Figure 15:
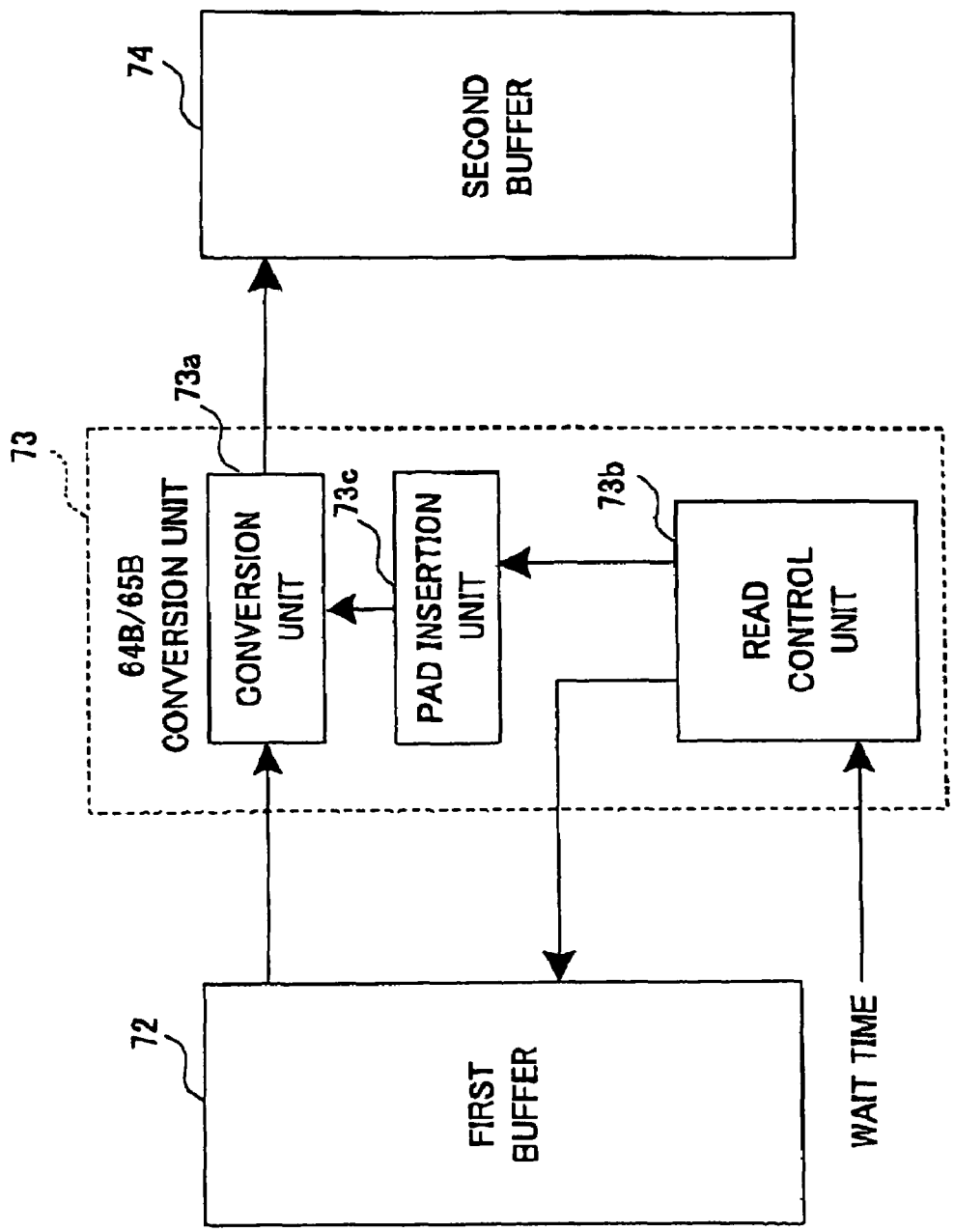
FIG. 15 is a block diagram of a 64B/65B conversion unit.
Figure 16:
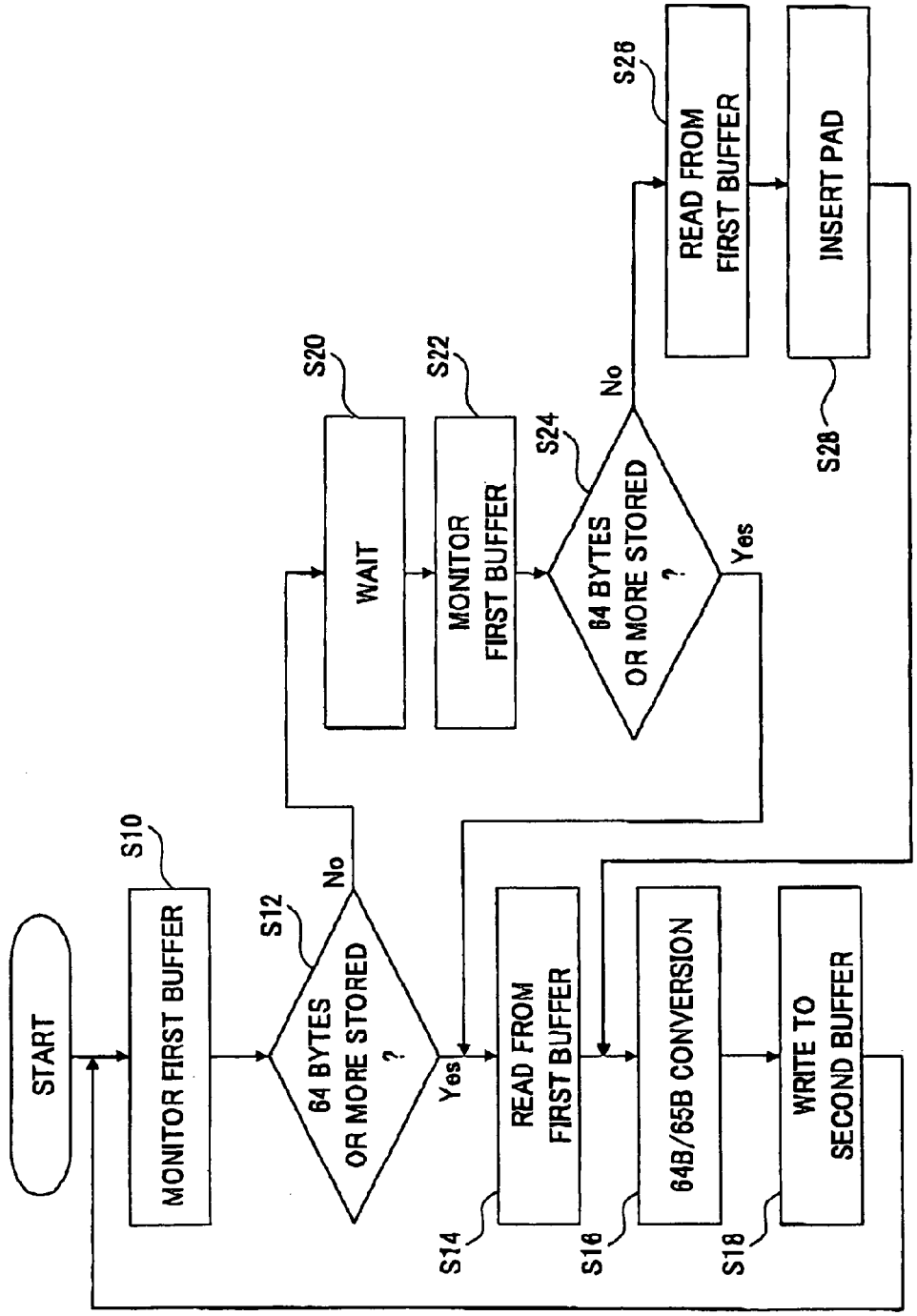
FIG. 16 is a flowchart showing operations of the 64B/65B conversion unit.

FIG. 15 is a block diagram showing the configuration of the 64B/65B conversion unit 73. FIG. 16 is a flowchart showing a process flow of the 64B/65B conversion unit 73. With reference to FIG. 15, the 64B/65B conversion unit 73 includes a conversion unit 73a, a read control unit 73b, and a PAD insertion unit 73c. The wait time is externally supplied, and set at the read control unit 73b.

With reference to FIG. 16, the read control unit 73a monitors how many bytes are stored in the first buffer 72 at S10. At S12, it is determined whether 64 bytes or more of MPEG2-TS packet are stored in the first buffer 72. If the determination is affirmative, a packet is read from the first buffer 72 at S14, the 64B/65B conversion unit 73 performs the 64B/65B conversion at S16, and a writing process is carried out to the second buffer 74 at S18.

If the determination at S12 is negative, i.e., if the amount of MPEG2-TS packet data stored in the first buffer 72 is less than 64 bytes, the process is suspended for the predetermined wait time at S20, the read control unit 73a determines whether the first buffer 72 stores 64 bytes or more at S22 and S24. If the determination at S24 is affirmative, the process proceeds to S14 where the packet is read from the first buffer 72, the 64B/65B conversion process is carried out at S16, and the writing process is carried out to the second buffer 74 at S18.

If the determination at S24 is negative, the data, amount of which is less than 64 bytes, in the first buffer 72 are read at S26, one or more PAD control codes are added to the above-mentioned data by the PAD insertion unit 73c such that the data amount to 64 bytes at S28, the 64B/65B conversion process is performed at S16, and the writing process is carried out to the second buffer 74 at S18.

In this manner, according to the present invention, the bandwidth of the SONET/SDH transmission network is efficiently used.

Figure 17:
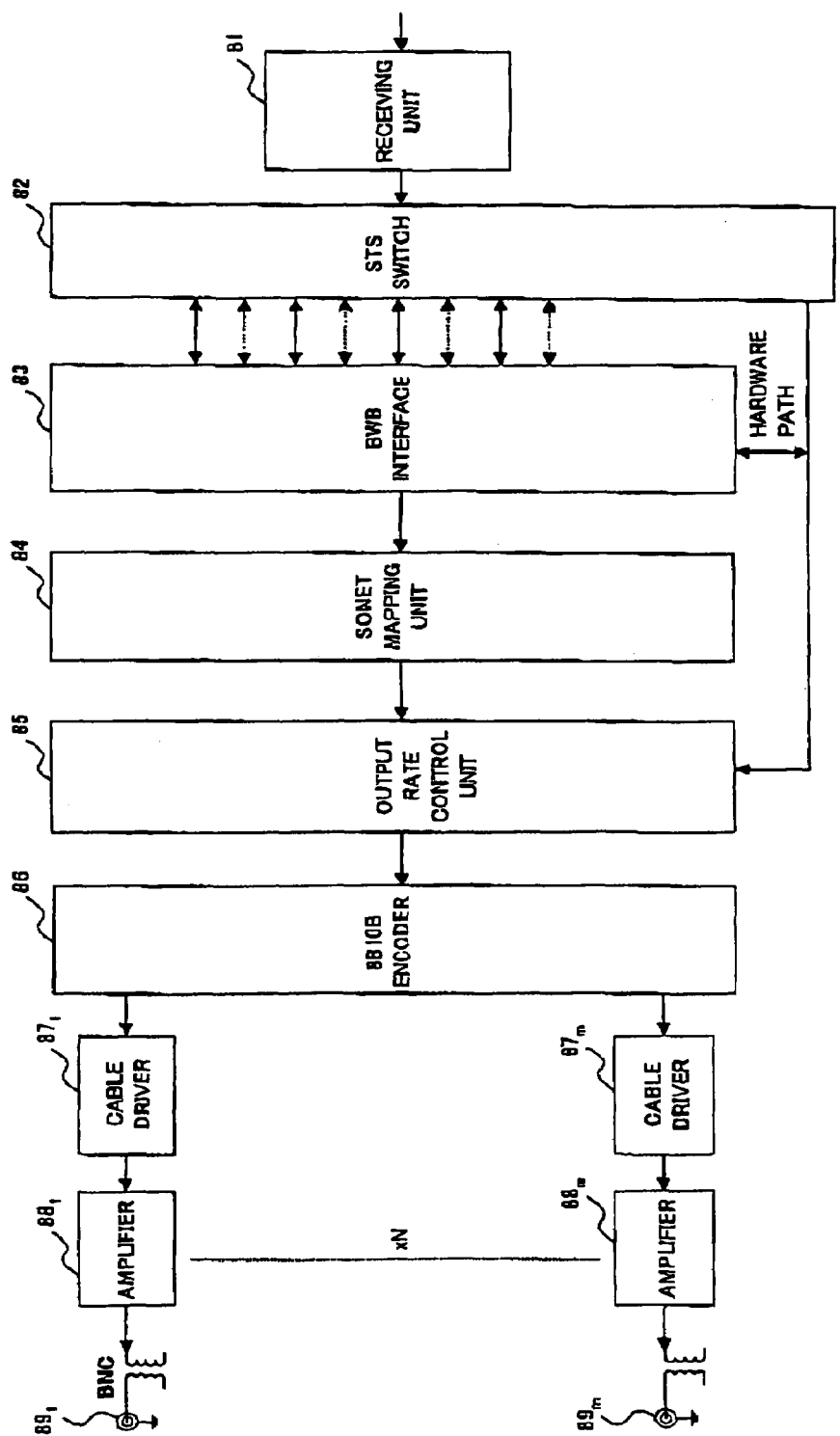
FIG. 17 is a block diagram of a SONET/SDH receiving unit according to the embodiment of the present invention.

FIG. 17 is a block diagram of the SONET/SDH receiving unit 55 according to the embodiment of the present invention. The SONET/SDH receiving unit 55 includes a receiving unit 81, an STS switch 82, a BWB interface 83, a SONET de-mapping unit 84, an output rate control unit 85, an 8B10B encoder 86, cable drivers 87$_l$ through 87$_m$, amplifiers 88$_l$ through 88$_m$, and output ports 89$_l$ through 89$_m$. The receiving unit 81 receives a serial signal from the optical transmission line 54, which serial signal is supplied to and switched by the STS switch 82. The BWB interface 83 converts the switched serial signal into four streams of parallel STS-12 data of eight-bit parallel data as shown in FIG. 9. The parallel STS-12 data are further converted into 32-bit parallel data of STS-48 as shown in FIG. 8. The STS-48 data are supplied to the SONET de-mapping unit 84.

The SONET de-mapping unit 84 decomposes the path STS-48 into paths STS-1-1v, STS-1-3v, STS-1-5v, and STS-1-6v, further de-maps to GFP frames, and provides the GFP frames to the output-rate control unit 85.

Here, when STS-1-6v has been originally assembled from STS-1#0 through STS-1#5, it is disassembled into STS-1 that is decomposed into frames having the same MFI according to the sequence number. Alternatively, STS-1-6v is recovered by re-assembling STS-1#0 through STS-1#5 having the same MFI according to the sequence number. Since frames may not arrive in the original sequence, a buffer is provided for storing two or more frames, and for re-assembling the frames.

The output rate control unit 85 de-maps the GFP frames, controls output rates for the output ports, and provides the GFP frames to the 8B10B encoder 86. The 8B10B encoder 86 converts the GFP frames from eight-bit codes into ten-bit codes for each output port, and the DVB-ASI signal containing a maximum of 72 channels of multiplexed MPEG-2 signals is obtained.

Each DVB-ASI signal is output from one of the output ports 89$_l$-89$_m$ through the respective cable drivers 87$_l$-87$_m$ and the amplifiers 88$_l$-88$_m$.

Figure 18:
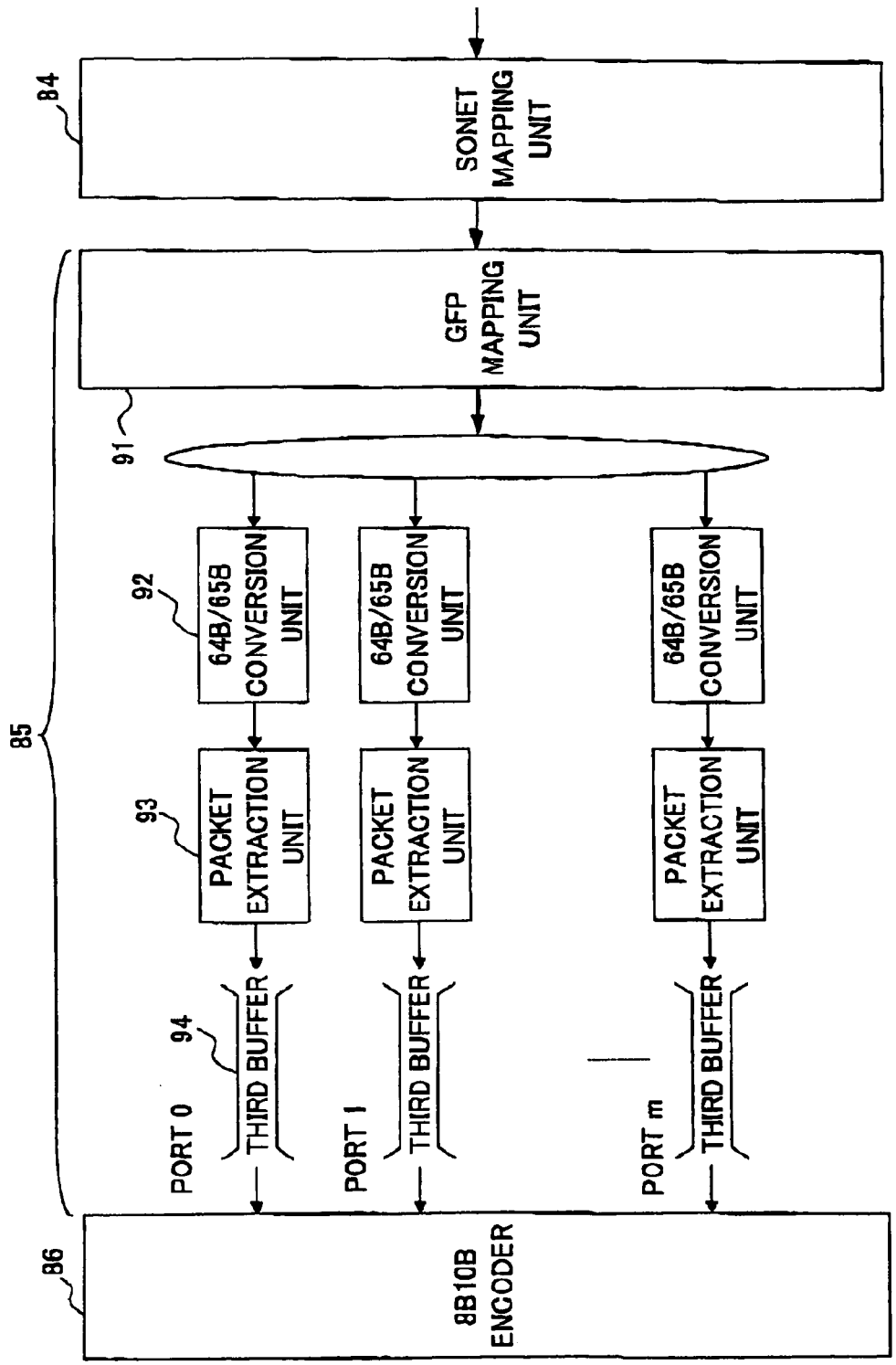
FIG. 18 is a block diagram for explaining output-rate control according to the present invention.

FIG. 18 is a block diagram showing details of the output rate control unit 85, which includes a GFP de-mapping unit 91, 64B/65B conversion units 92, packet extraction units 93, and third buffers 94.

A GFP frame output from the SONET de-mapping unit 84 is supplied to the GFP de-mapping unit 91, and the GFP frame is de-mapped into superblocks.

The de-mapped superblocks are read by the round robin method, and are supplied to the 64B/65B conversion units 92, corresponding to the output ports 89$_l$ through 89$_m$. In each 64B/65B conversion unit 92, frame conversion of 65B/64B is performed on a superblock, and the original MPEG-2TS packet is reproduced. Between the MPEG-2TS packets obtained here, at least 2 bytes of K28.5 space code are inserted.

Then, the MPEG-2TS packet is extracted by the respective packet extraction unit 93, and stored in the respective third buffer 94. The MPEG-2TS packet accumulated at the third buffer 94 is read in parallel by the 8B10B encoder 86 for each output port. The 8B10B encoder 86 performs 8B10B conversion of the read MPEG-2TS packet, converts the MPEG-2TS packet into ten-bit codes, and serially outputs the MPEG-2TS packet.

Here, in order to comply with the transmission rate of the serial output, e.g., 270 Mbps, the 8B10B encoder 86 embeds K28.5 space codes between MPEG-2TS packets (live data).

However, when the transmitting output clock after the 8B10B encoder 86 is faster than the clock of the receiving unit, data transmission becomes slower little by little on the transmitting side, and MPEG-2TS packets start piling up in the third buffer 94 that precedes the 8B10B encoder 86.

At this time, the third-buffer 94 discards MPEG-2TS packets that may arrive when the number of MPEG-2TS packets stored exceeds a third threshold value. As the time elapses, the MPEG-2TS packets in the third buffer 94 will have been sent out. When the number of the MPEG-2TS packets remaining in the third buffer 94 becomes smaller than a fourth threshold value (the fourth threshold value being less than the third threshold value), writing of MPEG-2TS packets is resumed.

Conversely, when the clock or the receiving unit is faster than the clock of the transmitting unit, there will be no MPEG-2TS packets to be read from the third buffer 94. A buffer under-run due to this is prevented from occurring by embedding K28.5 space codes such that the difference in the clocks can be compensated for.

Next, a process for optimizing the transmitting interval of the MPEG2-TS packets in the 8B10B encoder 86 is explained. The MPEG2-TS packets extracted by the packet extraction unit 93 are stored in the third buffer 94 shown in FIG. 18.

As described above, the transmitting side has deleted space codes, and only the required MPEG2-TS packets are mapped in SONET/SDH. That is, information about the interval between packets is lost. Under this situation, since a SONET/SDH frame is transmitted at a 125 μs cycle, it is possible that a DVB-ASI signal is provided to the receiving unit (the video switch and conversion unit 56 in FIG. 4) in burst within the 125 μs interval.

Generally, if the buffer capacity on the receiving side (the video switch and conversion unit 56) is as small as 512 bytes, and the burst transmission of a DVB-ASI signal takes place even during a short period of time such as 125 μs, overflow of the buffer on the receiving side can occur. The mechanism of the overflow occurring is explained.

Figure 19A:
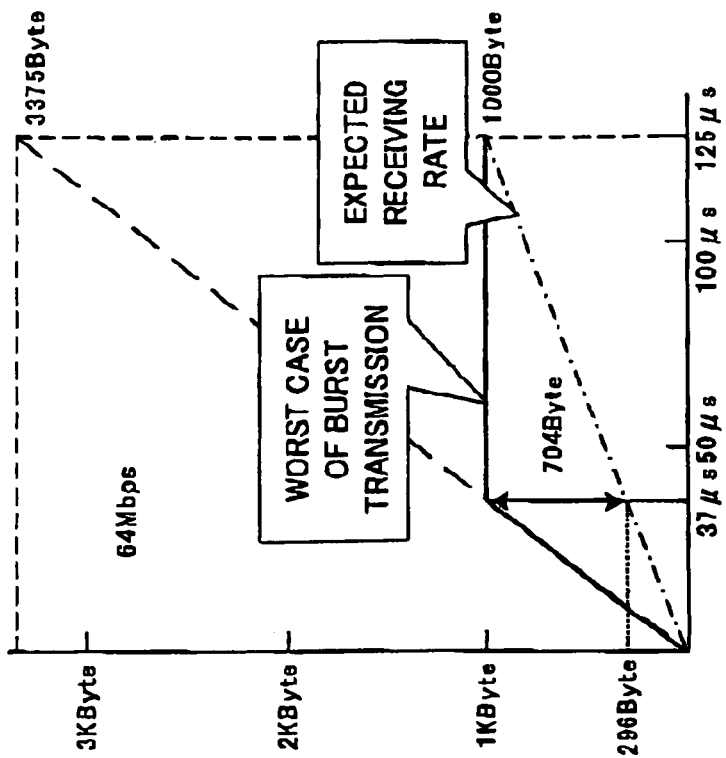
FIG. 19 graphs the amount of transmitted data in a 125 μs period that ia the transmitting unit of SONET/SDH.
Figure 19B:
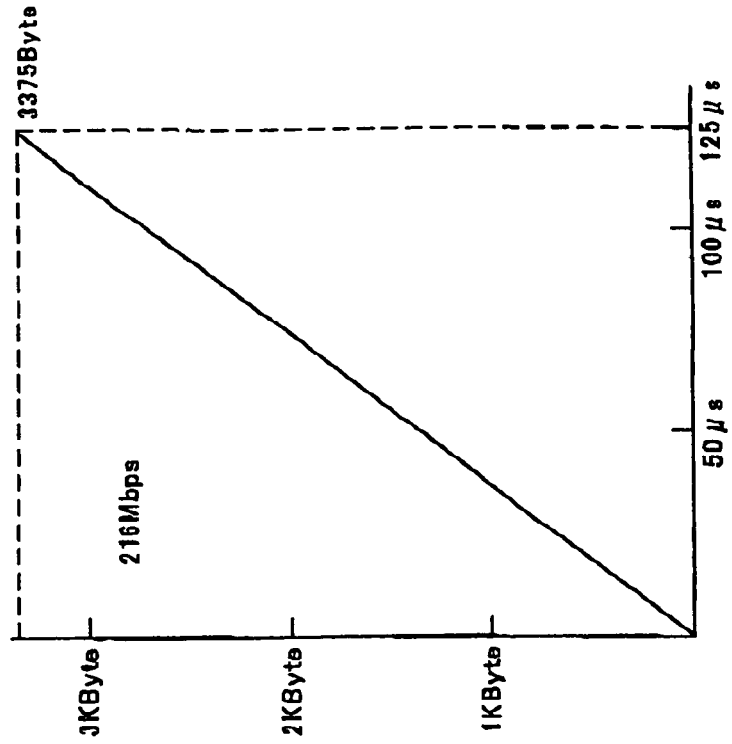

As for Graphs (A) and (B) of FIG. 19, the horizontal axis represents the time (μs), and the vertical axis represents amounts of transmission data (bytes). Here, the data are transmitted within the 125 μs interval, which is the transmitting unit of SONET/SDH. Inclination of Graphs (A) and (B) represents the transmission speed. When the DVB-ASI signal is at the full rate, i.e., 270 Mbps, the amount of data that can be transmitted is expressed as follows in consideration of the 8B/10B conversion.

270 Mbps×8/10=216 Mbps

The solid line of Graph (A) of FIG. 19, and the dashed line of Graph (B) of FIG. 19 show the relation between the amount of transmitted data and the time when at the full rate. The one-dot chain-line of Graph (B) of FIG. 19 shows the case when the transmission rate is 64 Mbps. The DVB-ASI transmission apparatus (such as the IRT 51 shown in FIG. 4) set up at the rate of 64 Mbps transmits data at the speed shown by the one-dot chain-line, and a DVB-ASI receiving unit (such as the video switch and conversion unit 56) expects that the data are input at the same speed.

As described above, there is no information about the interval between packets according to the method for mapping MPEG2-TS data to SONET/SDH according to the present invention. For this reason, by going via the SONET/SDH network that serves as a repeating facility, deviation occurs in arrangement of MPEG2-TS packets on the receiving side. The deviation becomes the greatest at the time of the full rate as shown by the dashed line in Graph (B) of FIG. 19.

In other words, MPEG2-TS packets are transmitted at the full rate for a first 37 μs period (refer to Graph (B)), and no. MPEG2-TS packets are transmitted afterwards until the end of the 125 μS period. In this case, MPEG2-TS packets that cannot be processed by the DVB-ASI receiving unit, but are stored in a TS buffer at the 37 μs time point become the greatest at 704 bytes, which exceeds 512 bytes that is the buffer capacity of a common DVB-ASI receiving unit. The overflow occurs in this manner.

In order to solve this overflow problem, according to the embodiment of the present invention, the packets stored in the third buffer 94 shown in FIG. 18 are read at intervals of 125 μs that is the frame cycle of SONET/SDH. In order to evenly output the MPEG2-TS packets stored in the third buffer 94 in the next 125 μs, the number of space codes to be inserted between each packet is calculated, and that many space codes are inserted.

Figure 20:
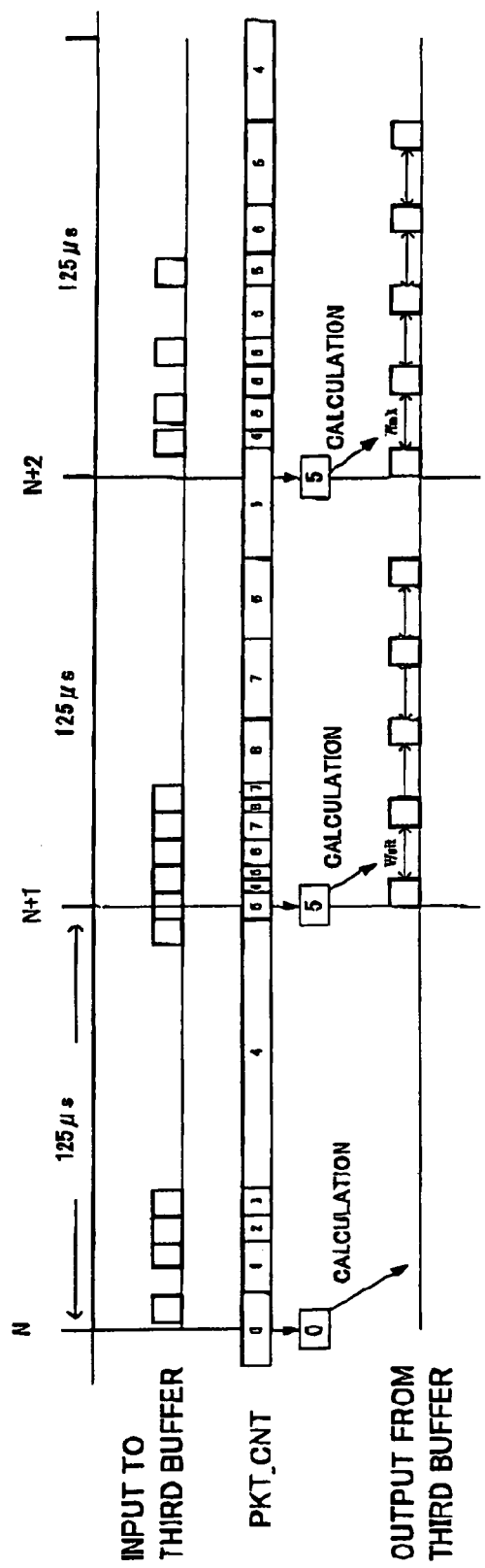
FIG. 20 is a chart for explaining operations for outputting packets equally from a third buffer.

Operations for even output are explained with reference to FIG. 20. Each square mark associated with the input to the third buffer 94 and the output from the third buffer 94 represents one MPEG2-TS packet. PKT_CNT expresses the number of packets stored in the third buffer 94. The 8B10B encoder 86 reads a PKT_CNT value for every 125 μs, and calculates the read-out speed based on the number of packets stored in the third buffer 94.

At a point in time N, PKT_CNT=0, in which case, no packets are output until the next 125 μs period.

At a point in time N+1, PKT_CNT=5, in which case a read-out wait time is calculated such that the five packets are transmitted uniformly during the next 125 μs period. Every time a packet is read, the reading operation is suspended for the read-out wait time, during which wait time, space codes are inserted. When PKT_CNT approaches and exceeds the number of packets that can be transmitted within the 125 μs period, the read-out wait time is set to 0, and continuous transmission is performed.

Figure 21:
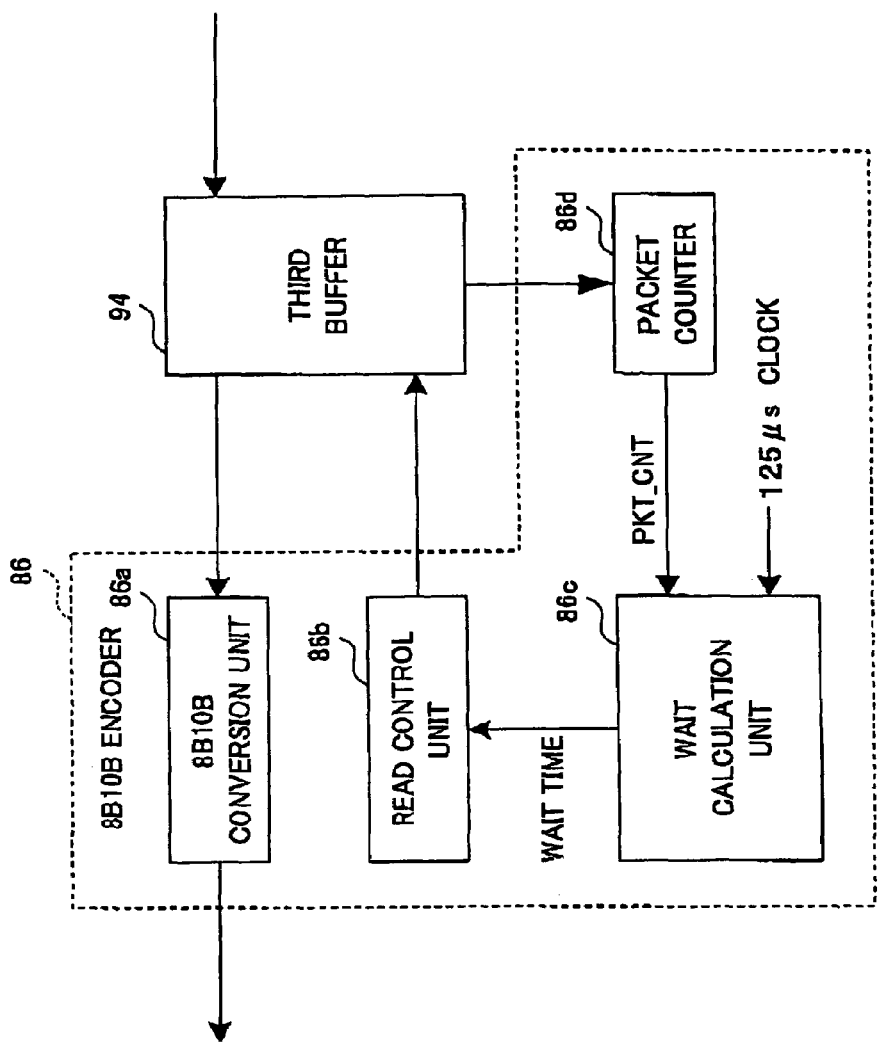
FIG. 21 is a block diagram of an 8B10B encoder.

FIG. 21 is a block diagram of the 8B10B encoder 86 that includes an 8B10B conversion unit 86a, a read control unit 86b, a wait time calculation unit 86c, and a packet counter 86d. The packet counter 86d counts PKT_CNT that is the number of packets stored in the third buffer 94, and PKT_CNT is provided to the wait time calculation unit 86c.

The wait time calculation unit 86c calculates a read-out wait time for evenly transmitting packets, i.e., at equal intervals, based on PKT_CNT provided by the packet counter 86d every 125 μs, and provides the calculated read-out time to the control unit 86b. The read control unit 86b issues a read command to the third buffer 94 so that the interval for outputting an MPEG2-TS packet becomes the read wait time. The 8B10B conversion unit 86a performs 8B10B conversion of the MPEG2-TS packet read from the third buffer 94, and outputs the converted packet to a following circuit (such as the cable driver 87).

In addition, since the third buffer 94 has to be capable of storing packets received in the past 125 μs, and handling the burst transfer of packets within a 125 μs period, the capacity of the third buffer 94 has to be equal to or greater than twice the number of packets that can arrive in the 125 μs period.

In this manner, MPEG2-TS packets without the information about the interval between packets can be transmitted to the DVB-ASI receiving unit without generating a receiver-buffer overflow.

As mentioned above, an economical transmission apparatus for distributing DVB-ASI signals from a CATV head-end station to a local distribution station using the existing SONET/SDH network is realized, wherein the DVB-ASI signals are mapped to GFP frames, and further mapped to virtual concatenation paths of the SONET/SDH for transmission. Further, DVB-ASI signals can be transmitted via the SONET/SDH network according to a bandwidth requirement of a customer (CATV operator), enabling the CATV operator to offer finely tuned services.

Further, since the rate (data speed) control is automatically performed according to the SONET/SDH network bandwidth set up, complicated controls are unnecessary, and the burden of the control system for controlling the CATV head-end station 50 can be reduced.

In addition, since a high quality TV signal can be compressed to 3.75 Mbps per channel by MPEG-2, and a usual television signal can be compressed to 1.5-2 Mbps per channel by MPEG-2, the system can be configured such that a DVB-ASI signal that contains multiple MPEG-2TS packets of 1.5-2 Mbps per channel is provided to the video switch 52.

In addition, although the embodiment described above is explained about an example using SONET, the present invention is also applicable to SDH, and the synchronous network is not limited to SONET.

In addition, the transmission rate control unit 64 corresponds to transmission rate setting means. The 8B10B decoder 63 corresponds to 8B10B decoding means, and the packet extraction unit 71 corresponds to space code deletion means. The first buffer 72 and the second buffer 74 correspond to packet discarding means. The GFP mapping unit 75 corresponds to GFP mapping means, the SONET mapping unit 65 corresponds to synchronous-network mapping means, the output-rate control unit 85 corresponds to output rate control means, and the SONET de-mapping unit 84 corresponds to synchronous network de-mapping means. The GFP de-mapping unit 91 corresponds to GFP de-mapping means, and the 8B10B encoder 86 corresponds to 8B10B encoding means.

Further, the present invention is not limited to these embodiments, but various variations and modifications may be made without departing from the scope of the present invention.

The present application is based on PCT International Application No. PCT/JP2003/014521 filed on Nov. 14, 2003 and Japanese Priority Application No. 2004-175719 filed on Jun. 14, 2004 with the Japanese Patent Office, the entire contents of which are hereby incorporated by reference.

What is claimed is:

1. A signal distribution method by which transport packets of a television signal that is multiplexed with a plurality of channels are supplied in a transmission format of a digital broadcasting standard, and said transport packets are transmitted and distributed over a synchronous network, the signal distribution method comprising:

setting a transmission rate in said synchronous network according to the number of the multiplexed channels for each customer, said setting comprising:

extracting transport packets and space codes and writing the extracted transport packets and predetermined space codes in a first buffer;

converting the transport packets read from the first buffer into a superblock and writing the superblock into a second buffer;

reading the superblock from the second buffer and performing a Generic Framing Protocol (GFP) mapping to map said superblock onto GFP frames; and discarding the transport packets supplied for a customer when a transmission rate thereof exceeds the transmission rate in the synchronous network set for said customer by prohibiting writing of the transport packets to the first buffer when an amount of the superblock written in the second buffer exceeds a threshold value, said converting comprising:

converting a predetermined number of the transport packets into the superblock if a byte count of said transport packets written in the first buffer is said predetermined number or greater;

suspending conversion to the superblock for a predetermined period if the byte count of said transport packets is less than said predetermined number; and converting the transport packets into the superblock if the byte count remains less than said predetermined number after a lapse of said predetermined period by adding PAD control codes such that the byte count becomes equal to the predetermined number.

2. The signal distribution method as claimed in claim 1, wherein said transport packets are MPEG-2TS packets in the transmission format of DVB-ASI, and said synchronous network is one of SONET and SDH networks.

3. The signal distribution method as claimed in claim 2, wherein space codes other than predetermined space codes of predetermined byte length between MPEG-2TS packets are deleted, and such MPEG-2TS packets are transmitted over said synchronous network.

4. A transmission apparatus for receiving transport packets of a television signal that is multiplexed with a plurality of channels in a transmission format of a digital broadcasting standard, and transmitting and distributing said transport packets over a synchronous network, the transmission apparatus comprising:

a transmission rate control unit configured to set a transmission rate in said synchronous network according to the number of the multiplexed channels for each customer, said transmission rate control unit comprising:

first and second buffers;

an extraction unit configured to extract transport packets and space codes and writing the extracted transport packets and predetermined space codes in the first buffer;

a conversion unit configured to convert the transport packets read from the first buffer into a superblock and writing the superblock into the second buffer; and a Generic Framing Protocol (GFP) mapping unit configured to read the superblock from the second buffer and to perform a GFP mapping to map said superblock onto GFP frames;

wherein the transport packets supplied for a customer are discarded when a transmission rate thereof exceeds the transmission rate in the synchronous network set for said customer by prohibiting writing of the transport packets to the first buffer when an amount of the superblock written in the second buffer exceeds a threshold value, and wherein said conversion unit converts a predetermined number of the transport packets into the superblock if a byte count of said transport packets written in the first buffer is said predetermined number or greater; suspends conversion to the superblock for a predetermined period if the byte count of said transport packets is less than said predetermined number; and converts the transport packets into the superblock if the byte count remains less than said predetermined number after a lapse of said predetermined period by adding PAD control codes such that the byte count becomes equal to the predetermined number.

5. The transmission apparatus as claimed in claim 4, wherein said transport packets are MPEG-2TS packets supplied in the transmission format of DVB-ASI, said synchronous network being one of SONET and SDH networks.

6. The transmission apparatus as claimed in claim 5, further comprising:

8B10B decoding means for performing 8B10B decoding of said MPEG-2TS packets supplied in the transmission format of DVB-ASI.

7. The transmission apparatus as claimed in claim 5, further comprising:

space code deletion means for deleting space codes other than predetermined space codes of predetermined byte length between MPEG-2TS packets.

8. The transmission apparatus as claimed in claim 4, further comprising:

synchronous network mapping means for mapping said GFP frames onto one of a plurality of paths that have different capacities by virtual concatenation according to the number of the multiplexed channels of a given customer, and for transmitting such GFP frames over one of SONET and SDH networks.

9. A transmission apparatus adapted to receive transport packets of a television signal in a transmission format of a digital broadcasting standard, and to transmit and distribute said transport packets over a synchronous network, said transmission apparatus comprising:

a transmission rate control unit configured to set a transmission rate in said synchronous network according to a number of multiplexed channels of the television signal for each customer, said transmission rate control unit comprising:
- first and second buffers;
- an extraction unit configured to extract transport packets and space codes and writing the extracted transport packets and predetermined space codes in the first buffer;
- a conversion unit configured to convert the transport packets read from the first buffer into a superblock and writing the superblock into the second buffer; and
- a Generic Framing Protocol (GFP) manning unit configured to read the superblock from the second buffer and to perform a GFP mapping to map said superblock onto GFP frames;

wherein said conversion unit converts a predetermined number of the transport packets into the superblock if a byte count of said transport packets written in the first buffer is said predetermined number or greater; suspends conversion to the superblock for a predetermined period if the byte count of said transport packets is less than said predetermined number; and converts the transport packets into the superblock if the byte count remains less than said predetermined number after a lapse of said predetermined period by adding PAD control codes such that the byte count becomes equal to the predetermined number.

* * * * *